US012729119B2

(12) United States Patent
Lim et al.

(10) Patent No.: US 12,729,119 B2
(45) Date of Patent: Sep. 8, 2026

(54) ELECTRODE ACTIVE MATERIAL, PREPARATION METHOD THEREFOR, ELECTRODE COMPRISING SAME AND SECONDARY BATTERY

(71) Applicant: Samsung Electronics Co., Ltd., Suwon-si (KR)

(72) Inventors: Sungjin Lim, Suwon-si (KR); Sangbok Ma, Suwon-si (KR); Jonghoon Ka, Suwon-si (KR); Taeyoung Kim, Suwon-si (KR); Youngjoon Bae, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 567 days.

(21) Appl. No.: 18/250,026

(22) PCT Filed: Jun. 15, 2021

(86) PCT No.: PCT/KR2021/007492

§ 371 (c)(1), (2) Date: Apr. 21, 2023

(87) PCT Pub. No.: WO2022/085891

PCT Pub. Date: Apr. 28, 2022

(65) Prior Publication Data

US 2023/0399239 A1 Dec. 14, 2023

(30) Foreign Application Priority Data

Oct. 22, 2020 (KR) ........................ 10-2020-0137613
Jun. 10, 2021 (KR) ........................ 10-2021-0075646

(51) Int. Cl.
*C01G 53/82* (2025.01)
*H01M 10/0525* (2010.01)

(52) U.S. Cl.
CPC ........ *C01G 53/82* (2025.01); *H01M 10/0525* (2013.01); *C01P 2002/72* (2013.01); *C01P 2002/74* (2013.01); *C01P 2006/40* (2013.01)

(58) Field of Classification Search
CPC ... H01M 10/0525; C01B 25/425; C01G 53/82
See application file for complete search history.

(56) References Cited

U.S. PATENT DOCUMENTS 7,914,932 B2 3/2011 Yoshida et al.
7,998,622 B2 8/2011 Inda
(Continued)

FOREIGN PATENT DOCUMENTS

CN 1780788 A 5/2006
CN 109328410 A 2/2019
(Continued)

OTHER PUBLICATIONS

Sanz (Year: 2000).*
(Continued)

*Primary Examiner* — Sadie White
(74) *Attorney, Agent, or Firm* — CANTOR COLBURN LLP

(57) ABSTRACT

An electrode active material including a compound represented by Formula 1:

$$Li_x(Ni_{1-y}M_y)_z(P_2O_7)_4 \quad \text{<Formula 1>}$$

wherein in Formula 1, 5≤x≤7, 0.2≤y<1, 4≤z≤6, and M is a Group 3 to Group 11 element or a combination thereof, but is not iron.

23 Claims, 20 Drawing Sheets

(56) References Cited

U.S. PATENT DOCUMENTS

| | | | | |
|---|---|---|---|---|
| 9,034,524 | B2 | 5/2015 | Moon et al. | |
| 9,118,068 | B2 | 8/2015 | Hayashi et al. | |
| 9,123,960 | B2 | 9/2015 | Sabi | |
| 9,190,652 | B2 | 11/2015 | Hayashi et al. | |
| 9,368,828 | B2 | 6/2016 | Ouchi et al. | |
| 9,419,308 | B2 | 8/2016 | Sano | |
| 9,577,285 | B2 | 2/2017 | Chu et al. | |
| 9,583,786 | B2 | 2/2017 | Lee et al. | |
| 9,859,559 | B2 | 1/2018 | Kim et al. | |
| 9,865,899 | B2 | 1/2018 | Ito et al. | |
| 10,033,037 | B2 | 7/2018 | Sato et al. | |
| 10,135,084 | B2 | 11/2018 | Lee et al. | |
| 10,454,109 | B2 | 10/2019 | Ohira et al. | |
| 10,497,933 | B2 | 12/2019 | Fujiki et al. | |
| 12,046,752 | B2 * | 7/2024 | Ma | H01M 10/0562 |
| 2004/0202935 | A1 | 10/2004 | Barker et al. | |
| 2004/0206938 | A1 * | 10/2004 | Barker | H01B 1/08 252/500 |
| 2005/0136331 | A1 * | 6/2005 | Jouanneau-Si Larbi | H01M 10/0525 429/231.95 |
| 2006/0091363 | A1 | 5/2006 | Barker et al. | |
| 2009/0197178 | A1 | 8/2009 | Inda et al. | |
| 2010/0003592 | A1 | 1/2010 | Fujita et al. | |
| 2012/0037844 | A1 | 2/2012 | Ceder et al. | |
| 2012/0235082 | A1 * | 9/2012 | Yamada | H01M 4/5825 252/182.1 |
| 2013/0189562 | A1 | 7/2013 | Dolle et al. | |
| 2015/0030929 | A1 | 1/2015 | Barker | |
| 2016/0204464 | A1 | 7/2016 | Cho et al. | |
| 2018/0219226 | A1 | 8/2018 | Kurita et al. | |
| 2019/0006702 | A1 | 1/2019 | Yoshioka et al. | |
| 2019/0067736 | A1 | 2/2019 | Yoshioka et al. | |
| 2019/0123354 | A1 | 4/2019 | Kurita et al. | |
| 2019/0140265 | A1 | 5/2019 | Miara et al. | |
| 2019/0157670 | A1 | 5/2019 | Wolter et al. | |
| 2019/0229334 | A1 | 7/2019 | Kurita | |
| 2019/0252727 | A1 | 8/2019 | Shimizu et al. | |
| 2020/0062613 | A1 | 2/2020 | Choi et al. | |
| 2020/0112025 | A1 | 4/2020 | Yamauchi | |
| 2020/0176812 | A1 | 6/2020 | Wang et al. | |
| 2020/0243839 | A1 * | 7/2020 | Iwata | H01M 4/525 |
| 2021/0043978 | A1 | 2/2021 | Takeuchi et al. | |
| 2021/0408531 | A1 * | 12/2021 | Ito | H01M 4/364 |

FOREIGN PATENT DOCUMENTS

| | | | |
|---|---|---|---|
| CN | 110521037 | A | 11/2019 |
| CN | 110858646 | A | 3/2020 |
| CN | 111717905 | A | 9/2020 |
| EP | 3480874 | A1 | 5/2019 |
| JP | 2006523930 | A | 10/2006 |
| JP | 2013519990 | A | 5/2013 |
| JP | 5682040 | B2 | 1/2015 |
| JP | 2018125181 | A | 8/2018 |
| JP | 6566137 | B2 | 8/2019 |
| JP | 2020113376 | A | 7/2020 |
| KR | 20180072113 | A | 6/2018 |
| KR | 20190053111 | A | 5/2019 |
| KR | 20200023730 | A | 3/2020 |
| WO | 2018003071 | A1 | 1/2018 |
| WO | 2019163448 | A1 | 8/2019 |
| WO | 2019188840 | A1 | 10/2019 |

OTHER PUBLICATIONS

Ahmet Ornet et al., Influence of gradual cobalt substitution on lithium nickel phosphate nano-scale composites for high voltage applications, Materials Characterization, 106, 2015, 152-162.

Fujitsu Develops High-Voltage Cathode Material for Lithium Iron Phosphate Rechargeable Batteries, Fujitsu, May 29, 2017, 1-4.

Huang Zhang et al., Exploring the Ni redox activity in polyanionic compounds as conceivable high potential cathodes for Na rechargeable batteries, NPG Asia Materials, 2017, 9, e370.

International Search Report for PCT?KR2021/007492 dated Oct. 1, 2021, International Search Report for PCT?KR2021/007492 dated Oct. 1, 2021.

Xinghao Lin et al., Phase relation of Li2O—CoO—P2O5 ternary system and electrochemical behaviors of Co-base polyphosphates within this system, Journal of Alloys and Compounds, 646, 2015, 727-733.

Extended European Search Report issued Feb. 19, 2025, in corresponding EP Patent Application No. 21882966.1, 5 pp.

Jun-chao Zheng et al., "Effects of Ni2+ doping on the performances of lithium iron pyrophosphate cathode material", Journal of Power Sources 268, 96-105. (2014).

Office Action issued Jul. 15, 2025, in corresponding JP Patent Application No. 2023-524821, with English translation, 8 pp.

Office Action issued Jun. 16, 2026 of CN Patent Application No. 202180072052.8.

* cited by examiner $Li_6Co(P_2O_7)_4$ (COMPARATIVE EXAMPLE 1)

$Li_6Co_4Ni_1(P_2O_7)_4$ (EXAMPLE 1)

$Li_6Co_3Ni_2(P_2O_7)_4$ (EXAMPLE 2)

$Li_6Co_2Ni_3(P_2O_7)_4$ (EXAMPLE 3)

$Li_6Co_1Ni_4(P_2O_7)_4$ (EXAMPLE 4)

$Li_6Ni_5(P_2O_7)_4$ (COMPARATIVE EXAMPLE 2)

ELECTRODE ACTIVE MATERIAL, PREPARATION METHOD THEREFOR, ELECTRODE COMPRISING SAME AND SECONDARY BATTERY

CROSS-REFERENCE TO RELATED APPLICATION

This application is based on and claims priority to International Application No. PCT/KR2021/007492 filed on Jun. 15, 2021, Korean Patent Application No. 10-2020-0137613 filed on Oct. 22, 2020, and Korean Patent Application No. 10-2021-0075646 filed on Jun. 10, 2021, in the Korean Intellectual Property Office, and all the benefits accruing therefrom under 35 U.S.C. § 119, the contents of each of which are incorporated by reference herein in their entirety.

TECHNICAL FIELD

The present disclosure relates to an electrode active material, a method of preparing the same, a cathode including the same, and a secondary battery.

BACKGROUND

Recently, in response to industrial demand, there has been active development of batteries having high energy density and safety. For example, lithium-ion batteries are being used not only in the fields of information-related devices and communication devices, but also in the field of automobiles. In the field of automobiles, safety is especially important because it affect life.

For lithium-ion batteries currently available on the market, it is necessary to increase their energy density and power density per mass or volume. For this, efforts to improve the voltage of positive electrode active materials are continuously being made.

Since lithium-ion batteries use an electrolyte solution containing a flammable organic solvent, there is a risk of overheating and fire when a short circuit occurs. In response to this, all-solid-state batteries using solid electrolytes, instead of liquid electrolytes, have been proposed.

All-solid-state batteries do not use flammable organic solvents, so even if a short circuit occurs, the probability of fire or an explosion may be greatly reduced. Therefore, such an all-solid-state battery may greatly improve safety as compared to a lithium-ion battery using an electrolyte solution. Since an all-solid-state battery can be charged beyond the voltage limit of a liquid electrolyte, the need for a high-voltage positive electrode material is gradually increasing.

In order to implement a battery using a high-voltage positive electrode material, it is necessary to reduce the interface resistance between the solid electrolyte and the positive electrode material. When using a phosphate-based solid electrolyte, it is possible to reduce the interface resistance between the solid electrolyte and the positive electrode material by using a phosphate-based positive electrode material. However, phosphate-based positive electrode active materials known so far have voltages as low as 3V, which is very low.

In particular, due to a limited selection of negative electrode materials applicable to multilayer ceramic (MLC) batteries, ceramic negative electrodes having high redox potential are currently being used. Accordingly, the voltage of a full cell is lowered, resulting in very low energy density.

SUMMARY

Provided is a novel electrode active material capable of implementing high voltage.

Provided are a positive electrode including the above-described electrode active material, and a secondary battery including the same.

Provided is a method of preparing the above-described electrode active material.

According to an aspect, provided is an electrode active material including a compound represented by Formula 1.

$$Li_x(Ni_{1-y}M_y)_z(P_2O_7)_4 \quad \text{<Formula 1>}$$

In Formula 1, $5 \leq x \leq 7$, $0.2 \leq y < 1$, and $4 \leq z \leq 6$,

M is a Group 3 to Group 11 element or a combination thereof, but is not iron.

According to another aspect, provided is an electrode including the above-described electrode active material.

According to another aspect, provided is a secondary battery including the electrode.

The secondary battery is a lithium secondary battery or an all-solid-state battery, and the all-solid-state battery is, for example, a multilayer ceramic (MLC) battery.

According to another aspect, provided is a method of preparing an electrode active material including a compound represented by Formula 1, the method comprising: mixing a nickel precursor, a lithium precursor, a phosphorus precursor, and an M precursor to obtain a precursor mixture; and heat-treating the precursor mixture $$Li_x(Ni_{1-y}M_y)_z(P_2O_7)_4 \quad \text{<Formula 1>}$$

wherein, in Formula 1, $5 \leq x \leq 7$, $0.2 \leq y < 1$, $4 \leq x \leq 6$, and M is a Group 3 to Group 11 element, or a combination thereof, but is not iron.

According to an aspect, provided is an electrode active material that is capable of realizing a high voltage and has excellent stability. When using a positive electrode including this electrode active material, a secondary battery having an average discharge voltage of 4.4V or greater and improved energy density may be manufactured.

BRIEF DESCRIPTION OF DRAWINGS

The above and other aspects, features, and advantages of certain embodiments of the disclosure will be more apparent from the following description taken in conjunction with the accompanying drawings, in which.

EXPLANATION OF REFERENCE NUMERALS DESIGNATING THE MAJOR ELEMENTS OF THE DRAWINGS

Figure 1A:
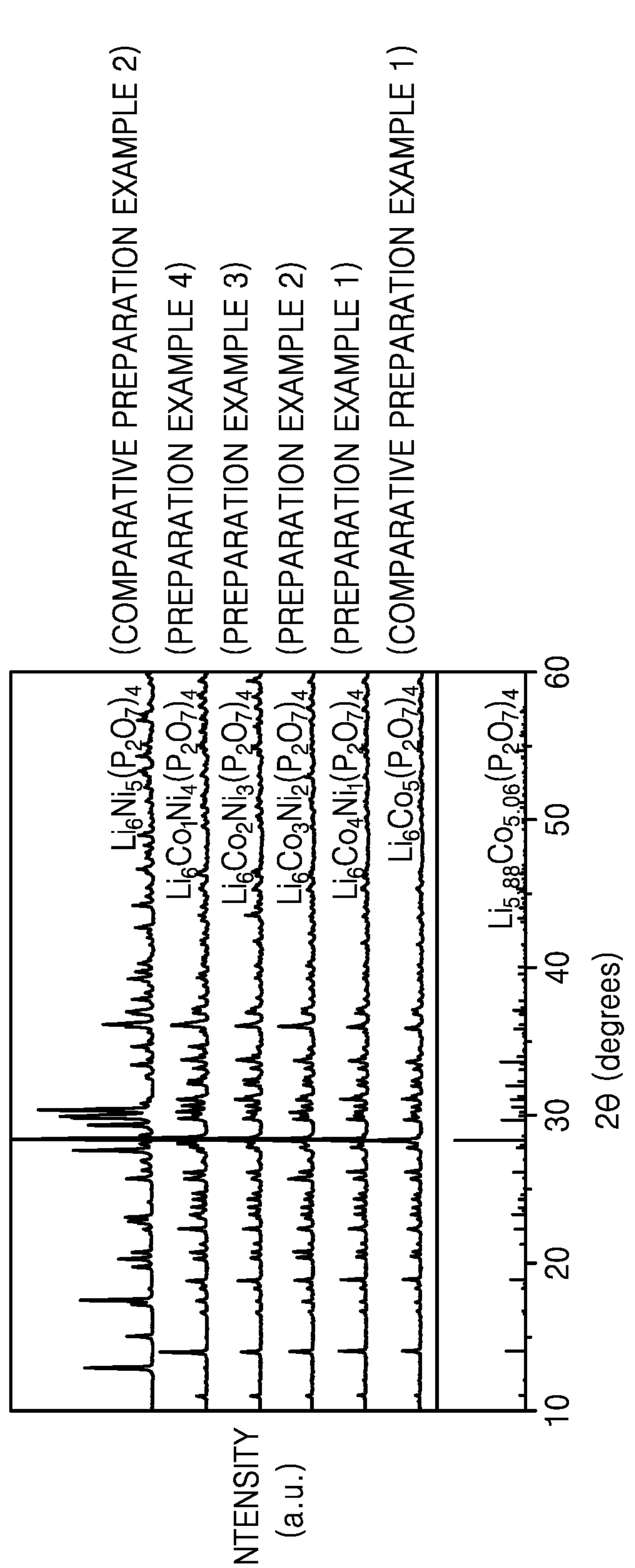
FIG. 1A represents results of X-ray diffraction analysis of positive active materials of Preparation Examples 1 to 4 and Comparative Preparation Examples 1 and 2.

1: all-solid-state secondary battery 10: positive electrode layer

11: positive electrode current collector 12: positive electrode active material layer

20 negative electrode layer 21: negative electrode current collector

22: negative electrode active material layer 30: solid electrolyte layer

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, an electrode active material, an electrode including the same and a secondary battery according to embodiments will be described in detail.

According to an aspect, provided is an electrode active material including a compound represented by Formula 1

$$Li_x(Ni_{1-y}M_y)O_z(P_2O_7)_4 \quad \text{<Formula 1>}$$

in Formula 1, 5≤x≤7, 0.2≤y<1, 4≤x≤6, and M is a Group 3 to Group 11 element, or a combination thereof, but is not iron (Fe).

In Formula 1, 5.5≤x≤6.5, 0.2≤y<1, and 4.8≤z≤5.2.

x is a number from 5.8 to 6.2, y is a number from 0.3 to 0.9, and z is a number from 4.9 to 5.1.

In Formula 1, M is Co, Mn, V, Ti, Cr, Cu, Sc, Y, La, Zr, Hf, Nb, Ta, Mo, W, Tc, Re, Ru, Os, Co, Rh, Ir, Pd, Pt, Cu, Ag, Au, or a combination thereof, for example, M is Co, Mn, V, Ti, Cr, Cu, Sc, or a combination thereof.

The electrode active material is, for example, a positive electrode active material or a negative electrode active material.

In order to implement a battery using a positive electrode material capable of implementing a high voltage, it is necessary to reduce the interface resistance between a solid electrolyte and the positive electrode material. When using a phosphate-based solid electrolyte, the interface resistance between the solid electrolyte and the positive electrode material can be reduced by using a phosphate-based positive electrode material. However, phosphate-based positive electrode materials known so far have a very low discharge voltage of 3 V.

A ceramic negative electrode having a high redox potential is used as the negative electrode of a multilayer ceramic (MLC) battery. However, such an MLC battery has a low voltage and thus low energy density, and improvement is required in this regard.

Known positive electrode materials are $Li_6Fe_5(P_2O_7)_4$ and $Li_6Co_5(P_2O_7)_4$. Of these materials, $Li_6Fe_5(P_2O_7)_4$ has a low discharge voltage of 3.5V, and thus it is hard to achieve a high voltage with this material. In addition, $Li_6Co_5(P_2O_7)_4$ has superior stability, but unsatisfactory voltage characteristics, and thus improvement is required.

In embodiments, the positive electrode active material essentially contains nickel (Ni) having excellent high-voltage characteristics and M which is a phase stabilization element, as represented by Formula 1, and thus has excellent high-voltage discharge characteristics and phase stability. A positive electrode containing such a positive electrode active material can have a high voltage of 4.4V or more, 4.8V or more, for example, 5V or more, and a secondary battery capable of implementing a high-energy density of about 800 Wh/kg can be manufactured.

In embodiments, the positive electrode active material is a $Li_6M_5(P_2O_7)_4$ positive electrode active material, which has a triclinic crystal structure and a space group of (p−1). When in the formula of $Li_6M_5(P_2O_7)_4$, M is nickel (Ni), the phase of the $Li_6M_5(P_2O_7)_4$ is very unstable. However, when M includes one or more elements selected from the elements of Group 3 to Group 11 other than Ni, the phase of the $Li_6M_5(P_2O_7)_4$ may be stabilized and the discharge amount in a high-voltage range is excellent.

The compound represented by Formula 1 may be one or more selected from the compounds represented by Formulae 2 to 4:

$$Li_x(Ni_{1-y}CO_y)_z(P_2O_7)_4 \quad \text{<Formula 2>}$$

in Formula 2, 5≤x≤7, 0.2≤y<1, and $$Li_x(Ni_{1-y}Mn_y)_z(P_2O_7)_4 \quad \text{<Formula 3>}$$

in Formula 3, 5≤x≤7, 0.2≤y<1, and or $$Li_x(Ni_{1-y-a}A_a)_z(P_2O_7)_4 \quad \text{<Formula 4>}$$

in Formula 4, 5≤x≤7, 0.2≤y<1, 4≤z≤6, and 0<a≤0.2, and A is V, Nb, Ta, or a combination thereof.

In Formulae 2 to 4, 5.5≤x≤6.5, 0.2≤y<1, and 4.8≤z≤5.2.

The compound represented by Formula 1 may be, for example, $Li_6Ni_2Co_3(P_2O_7)_4$, $Li_6Ni_3Co_2(P_2O_7)_4$, $Li_6Ni_1Co_4(P_2O_7)_4$, $Li_6Ni_4Co_1(P_2O_7)_4$, $Li_6Mn_3Ni_2(P_2O_7)_4$, $Li_6Mn_2Ni_3$ $(P_2O_7)_4$, $Li_6Mn_2Ni_1(P_2O_7)_4$, $Li_6Mn_2V_1Ni_2(P_2O_7)_4$, $Li_6Mn_2Nb_1Ni_2(P_2O_7)_4$, $Li_6Mn_2Ta_1Ni_2(P_2O_7)_4$, $Li_6Tc_3Ni_2(P_2O_7)_4$, $Li_6Re_3Ni_2(P_2O_7)_4$, $Li_6Ni_2Rh_3(P_2O_7)_4$, $Li_6Ni_1Rh_4(P_2O_7)_4$, $Li_6Ni_2Ir_3(P_2O_7)_4$, $Li_6Ni_1Ir_4(P_2O_7)_4$, $Li_6Ni_2V_3(P_2O_7)_4$, $Li_6Ni_1V_4(P_2O_7)_4$, $Li_6Ni_2Nb_3(P_2O_7)_4$, $Li_6Ni_1Nb_4(P_2O_7)_4$, $Li_6Ni_2Ta_3(P_2O_7)_4$, $Li_6Ni_1Ta_4(P_2O_7)_4$, $Li_6Co_2V_1Ni_2(P_2O_7)_4$, $Li_6Co_2V_2Ni_1(P_2O_7)_4$, $Li_6Ti_3Ni_2(P_2O_7)$, $Li_6Cr_3Ni_2(P_2O_7)_4$, $Li_6Cu_3Ni_2(P_2O_7)_4$, $Li_6Sc_3Ni_2(P_2O_7)_4$, or a combination thereof.

The compound of Formula 1 exhibits a main peak in a diffraction angle 2θ range of 28.5±2°, as measured by X-diffraction analysis with CuKα radiation. A ratio (P2/P1) of the minor peak intensity (P2) to the main peak intensity (P1) of the compound of Formula 1, as obtained by X-ray diffraction analysis with CuKα radiation, is 0.4 or less, 0.1 to 0.4, or 0.2 to 0.35.

The term "main peak" as used herein refers to a peak having the maximum intensity, and the term "minor peak" refers to a peak having the second highest intensity smaller than the intensity of the main peak.

In a dQ/dV charge/discharge differential curve of a battery having a positive electrode including the compound of Formula 1, a dQ/dV peak voltage at which a maximum discharge curve area appears in a voltage range of 3.0V to 5.5V at a current of 0.025 C is 4.7 V or higher with respect to Li/Li+. In the dQ/dV charge/discharge differential curve, the dQ/dV peak voltage at which a maximum discharge curve area appears in a voltage range of 3.0V to 5.5V at a current of 0.025 C is, for example, 4.8 V or higher (with respect to Li/Li+), 4.8 to 5.2V, or 4.8 to 5.15V.

In a dQ/dV charge/discharge differential curve of a battery having an electrode including the compound of Formula 1 according to an embodiment, a ratio (A2/A1) of the area (A2) of a discharge curve at 4.7V to 5.5V to the area (A1) of a discharge curve at 3.5V to 5.5V under conditions of a current of 0.025 C and a voltage of 3.0V to 5.5V is 0.4, 0.4 to 1.0, 0.43 to 0.55, or 0.434 to 0.531. The electrode may be, for example, a positive electrode.

In embodiments, the compound represented by Formula 1 may be prepared by a wet or dry method. Hereinafter, a method of preparing the compound of Formula 1 according to a dry method will be described.

First, a lithium precursor, a nickel precursor, a phosphorus precursor, and an M precursor are mixed to obtain a precursor mixture.

The mixing can be carried out, for example, through mechanical milling. It is possible to add a solvent in mechanical milling, as necessary. The solvent may be, for example, acetone, ethanol, water, ethylene glycol, isopropanol, or a combination thereof. The amount of the solvent is in the range of 50 to 1,000 parts by weight, for example 100 to 300 parts by weight, based on 100 parts by weight of the total weight of the precursor compound. When a solvent is added, the precursors may be more uniformly mixed.

The mechanical milling may be carried out according to methods known in the art. The milling may be carried out using, for example, a ball mill, an air jet mill, a bead mill, a roll mill, a planetary mill, or the like.

The lithium precursor may be at least one selected from lithium oxide, lithium carbonate, lithium chloride, lithium sulfide, lithium nitrate ($LiNO_3$), lithium phosphate, and lithium hydroxide.

The phosphorus precursor may be, for example, include $(NH_4)_2HPO_4$, $(NH_4)H_2PO_4$, $LiPO_3$, $LiH_2PO_4$, or the like.

The M precursor is, for example, an element M-containing oxide, an element M-containing carbonate, an element M-containing chloride, an element M-containing phosphate, an element M-containing hydroxide, an element M-containing nitrate, an element M-containing hydroxide, an element M-containing oxalate, or a combination thereof. For example, the M precursor may be cobalt oxide, cobalt sulfate, cobalt hydroxide, cobalt nitrate, manganese oxide, manganese sulfate, manganese hydroxide, manganese nitrate, manganese oxalate, vanadium oxide, vanadium sulfate, vanadium hydroxide, vanadium nitrate, titanium oxide, titanium sulfate, titanium hydroxide, titanium nitrate, titanium oxalate, chromium oxide, chromium sulfate, chromium hydroxide, chromium nitrate, chromium oxalate, copper oxide, copper sulfate, copper hydroxide, copper nitrate, copper oxalate, cobalt oxalate, iron oxalate, or the like.

The nickel precursor may be nickel oxide, nickel chloride, nickel sulfate, nickel nitrate, or a combination thereof. The phosphorous precursor may be, for example, $(NH_4)_2HPO_4$, $(NH_4)H_2PO_4$, $LiPO_3$, $LiH_2PO_4$, or the like.

After performing mixing as described above, a resulting product obtained through the above-described process may be heat-treated to obtain the compound represented by Formula 1. The heat treatment is performed at 500° C. to 1000° C., 550° C. to 900° C., or 600° C. to 750° C. The heat treatment is performed in an inert gas atmosphere or a reducing gas atmosphere. The inert gas atmosphere includes an inert gas such as argon or nitrogen. The reducing gas atmosphere may be created by mixing such an inert gas as described above with hydrogen at 3% by volume or less or 0.1 to 3% by volume of hydrogen. The temperature increase rate in the heat treatment is 1° C./min to 10° C./min.

Optionally, prior to the heat treatment, drying may be performed. When drying is performed, the drying may be performed at 30° C. to 150° C., 50° C. to 130° C., 60° C. to 120° C., or 80° C. to 100° C. When drying is performed as above, a positive electrode active material having higher energy density can be obtained.

The compound of Formula 1 can be prepared using a liquid phase method, as well as the above-described solid phase method.

According to another aspect, provided is an electrode including the above-described electrode active material. The electrode may be, for example, a positive electrode including a positive electrode active material or a negative electrode including a negative electrode active material.

In embodiments, the electrode active material may be contained in a negative electrode.

According to another aspect, provided is a secondary battery including the above-described electrode. Here, the electrode is a positive electrode or a negative electrode.

The secondary battery is a lithium secondary battery or an all-solid-state battery.

The all-solid-state battery may be, for example, a multilayer ceramic (MLC) battery.

The multilayer ceramic (MLC) battery may a laminate structure in which a plurality of cell units, each including a positive electrode layer including a positive electrode active material layer, a solid electrolyte layer, and a negative electrode layer including a negative electrode active material layer, wherein the positive electrode layer including the positive electrode active material layer, the solid electrolyte layer, and the negative electrode layer including the negative electrode active material layer, are continuously stacked in order such that the positive active material layer and the negative electrode active material layer face each other. In other embodiments, the multilayer ceramic battery may further include a positive electrode current collector and/or a negative electrode current collector. When the multilayer ceramic battery includes a positive electrode current collector, positive electrode active material layers may be arranged on both sides of the positive electrode current collector. In addition, when the multilayer ceramic battery includes a negative electrode current collector, negative electrode active material layers may be disposed on both surfaces of the negative electrode current collector.

The multilayer ceramic battery comprises a laminate in which a plurality of unit cells, each including, sequentially in the stated order, a positive electrode active material layer, a solid electrolyte layer, and a negative electrode active material layer, wherein the positive electrode active material layer, the solid electrolyte layer, and the negative electrode active material layer, are stacked such that the positive active material layer and the negative electrode active material layer of adjacent unit cells face each other.

In an embodiment, a current collector layer may be provided on either one or both of the uppermost and lowermost layers of the laminate.

In an embodiment, the positive electrode active material and the secondary battery may be used in an application power source for an internet of Things (IoT) device, a power source for wearable devices, or the like.

In an embodiment, the positive electrode active material may be applicable in a thin film battery and a multilayer ceramic battery. The positive electrode active material may be applicable to a small battery, and a large battery for electric vehicles (EV), energy storage systems (ESS), or the like.

The secondary battery is an all-solid-state secondary battery including: a positive electrode layer that contains a positive electrode active material layer; a negative electrode layer that contains a negative current collector layer and a first negative active material layer or a third negative active material layer; and a solid electrolyte layer arranged between the positive electrode layer and the negative electrode layer, wherein the positive active material layer contains a positive electrode active material including a compound represented by Formula 1

$$Li_x(Ni_{1-y}M_y)_z(P_2O_7)_4 \quad \text{<Formula 1>}$$

in Formula 1, $5 \leq z \leq 7$, $0.2 \leq y < 1$, $4 \leq z \leq 6$, and

M is a Group 3 to Group 11 element, or a combination thereof, but is not iron (Fe).

The first negative electrode active material layer includes one or more selected from a carbonaceous negative electrode active material and a metal or metalloid negative electrode active material.

The carbonaceous negative electrode active material includes one or more selected from amorphous carbon and crystalline carbon, and the metal or metalloid negative active material includes one or more selected from the group consisting of gold (Au), platinum (Pt), palladium (Pd), silicon (Si), silver (Ag), aluminum (Al), bismuth (Bi), tin (Sn), and zinc (Zn).

The secondary battery further includes a second negative electrode active material layer arranged at least one of between the negative electrode current collector and the first negative electrode active material layer and between the solid electrolyte layer and the first negative electrode active material layer. The second negative electrode active material is a metal layer including lithium or a lithium alloy.

In an embodiment, in the all-solid state secondary battery, the third negative electrode active material layer is a metal layer including lithium or a lithium alloy.

In an embodiment, the second battery may be an ultra-small all-solid-state secondary battery.

Figure 6:
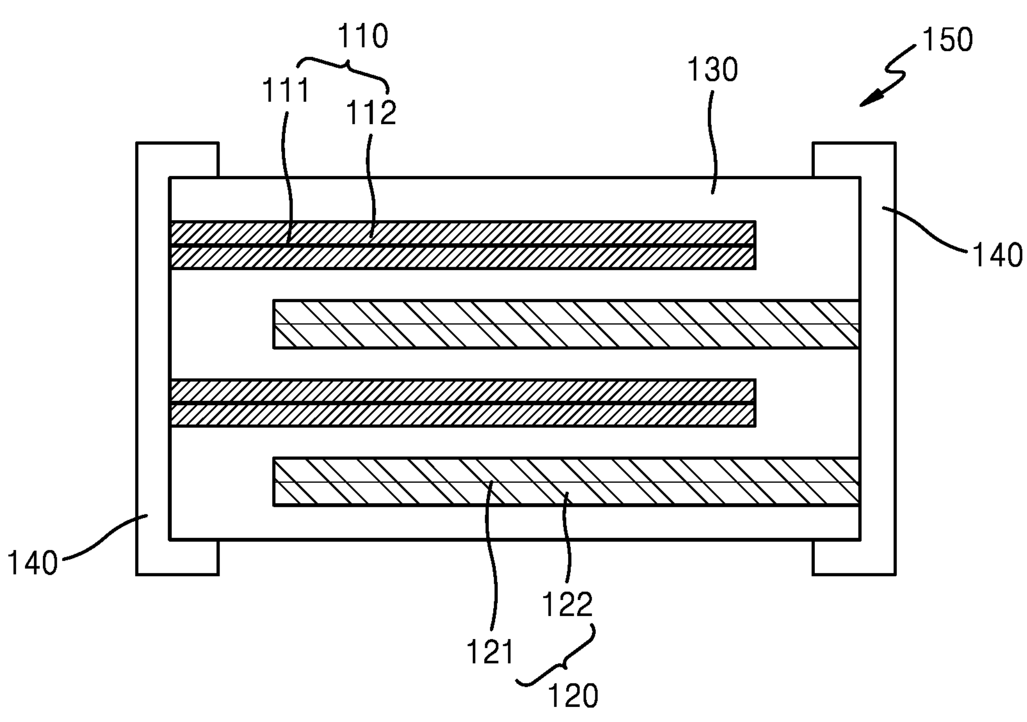
FIG. 6 schematically illustrates a structure of a multilayer ceramic battery according to an embodiment.

FIG. 6 schematically illustrates a structure of a multilayer ceramic (MLC) battery according to an embodiment.

Referring to FIG. 6, the MLC battery may be manufactured by sequentially stacking an oxide electrode and a solid electrolyte, and then simultaneously heat-treating the oxide electrode and the solid electrolyte.

Referring to FIG. 6, positive electrode active material layers 112 containing the positive electrode active material according to an embodiment are arranged on both surfaces of a positive electrode current collector 111 to form a positive electrode 110. Negative electrode active material layers 122 are stacked on both surfaces of a negative electrode current collector 121 to form a negative electrode 120. As shown in FIG. 6, a solid electrolyte 130 may be arranged between the positive electrode 110 and the negative electrode 120. External electrodes 140 are formed on both end portions of a battery main body 150. The external electrodes 140 are connected to the positive electrode 110 and the negative electrode 120, respectively, of which ends are exposed to the outside of the battery main body 150, and thus serve as external terminals that electrically connect the positive electrode 110 and the negative electrode 120 to external devices. Either one of the pair of external electrodes 140 is connected to the positive electrode 110 of which one end is exposed to the outside of the battery main body 150, and the other one is connected to the negative electrode 120 of which the other end is exposed to the outside of the battery main body 150.

In an embodiment, the secondary battery may be a multilayer solid electrolyte that includes: at least first and second unit cells, each including a positive electrode layer, a solid electrolyte layer and a negative electrode layer which are sequentially stacked on one another; and an internal current collecting layer which is arranged between the first and second unit cells such that the positive electrode layers of the first and second unit cells contact each other or the negative electrode layers of the first and second unit cells contact each other.

The negative electrode active material of the negative electrode active material layer is an oxide containing a Group 2 to Group 14 element, and may include, for example, a lithium titanium oxide, a lithium transition metal oxide, lithium metal phosphate, a titanium oxide, a vanadium oxide, or a combination thereof.

The lithium metal phosphate is $Li_3Fe_2(PO_4)_3$ or $Li_xV_2(PO_4)_3$ (wherein $0 < x \leq 5$).

The oxide negative electrode includes, for example, a lithium compound selected from the group consisting of $Li_{4/3}Ti_{5/3}O_4$, $LiTiO_2$, $LiM1_sM2_tO_u$ (wherein M1 and M2 are transition metals, and s, t and u are each any positive number), $TiO_x$ (wherein $0 < x \leq 3$), $V_2O_5$, $Li_xV_2(PO_4)_3$ (wherein $0 < x \leq 5$), and $Li_3Fe_2(PO_4)_3$. For example, the lithium compound may be $Li_{4/3}Ti_{5/3}O_4$, or $LiTiO_2$. $TiO_x$ (wherein $0 < x \leq 3$) may be, for example, $TiO_2$.

The negative active material is, for example, vanadium oxide ($V_2O_5$), $Li_4Ti_5O_{12}$, $TiO_2$, $LiTiO_2$, $Li_3V_2(PO_4)_3$, $Li_3Fe_2(PO_4)_3$, or a combination thereof.

When a current collector layer functions as a positive electrode current collector and negative electrode current collector, the current collector layer may both consist of any metal of Ni, Cu, Ag, Pd, Au, and Pt, or may consist of an alloy including any of Ni, Cu, Ag, Pd, Au, and Pt. The alloy may be an alloy of two or more selected from Ni, Cu, Ag, Pd, Au, and Pt, for example, an Ag/Pd alloy. In addition, these metals and alloys may be used alone or may be a mixture of two or more thereof. The current collector layer as the positive electrode current collector and the current collector layer as the negative electrode current collector may use the same material or may use different materials. In particular, an alloy or mixed powder including silver (Ag) and palladium (Pd) has advantages as follows: the melting point may be continuously and arbitrarily varied from the melting point (962° C.) of silver to the melting point (1550° C.) of palladium according to the mixing ratio, and thus it is possible to control the melting point to a batch firing temperature; and battery internal resistance can be suppressed due to high electronic conductivity.

The metal layer may use materials as described above with respect to the current collector layer. The metal layer and the current collector layer may use the same or different material.

The solid electrolyte contains an ionically conductive inorganic material, for example, an oxide-based solid electrolyte.

The oxide-based solid electrolyte is, for example, $Li_{1+x+y}Al_xTi_{2-x}Si_yP_{3-y}O_{12}$ (wherein $0<x<2$ and $0 \leq y<3$), $BaTiO_3$, $Pb(Zr,Ti)O_3$(PZT), $Pb_{1-x}La_xZr_{1-y}Ti_yO_3$(PLZT) (wherein $0 \leq x<1$ and $0 \leq y<1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, SiC, lithium phosphate $Li_3PO_4$), lithium titanium phosphate ($Li_xTi_y(PO_4)_3$, $0<x<2$, and $0<y<3$), lithium aluminum titanium phosphate ($Li_xAl_yTi_z(PO_4)_3$, $0<x<2$, $0<y<1$, $0<z<3$), $Li_{1+x+y}(Al, Ga)_x(Ti, Ge)_{2-x}Si_yP_{3-y}O_{12}$ (wherein $0 \leq x \leq 1$ and $0 \leq y \leq 1$), lithium lanthanum titanate ($Li_xLa_yTiO_3$, $0<x<2$, and $0<y<3$), lithium germanium thiophosphate ($Li_xGe_yP_zS_w$, $0<x<4$, $0<y<1$, $0<z<1$, and $0<w<5$), lithium nitride-based glass ($Li_xN_y$, $0<x<4$, and $0<y<2$), $SiS_2$($Li_xSi_yS_z$, $0<x<3$, $0<y<2$, and $0<z<4$), $P_2S_5$-based glass ($Li_xP_yS_z$, $0<x<3$, $0<y<3$, and $0<z<7$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramics, Garnet-based ceramics $Li_{3+x}La_3M_2O_{12}$ (wherein M is Te, Nb, or Zr, and x is an integer of 1 to 10), or a combination thereof.

The solid electrolyte is, for example, a lithium compound selected from the group consisting of $Li_{3.25}Al_{0.25}SiO_4$, $Li_3PO_4$, $LiP_xSi_yO_z$ (wherein x, y, and z are any positive numbers), and for example, is $Li_{3.5}P_{0.5}Si_{0.5}O_4$.

Figure 7:
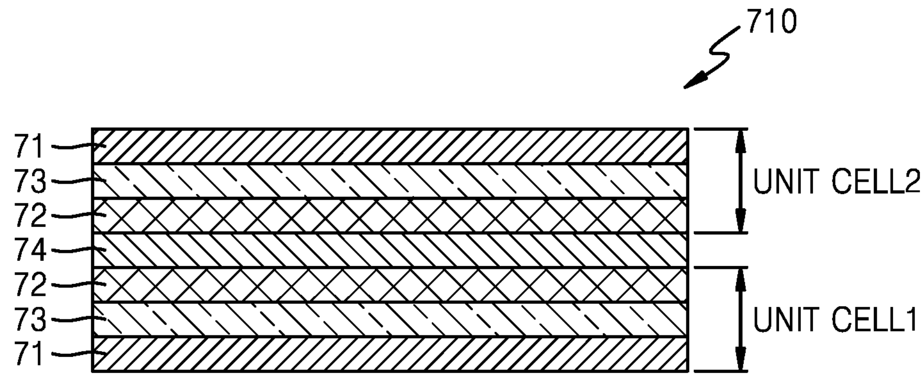
FIG. 7 schematically illustrates a structure of secondary battery according to other embodiments.
Figure 8:
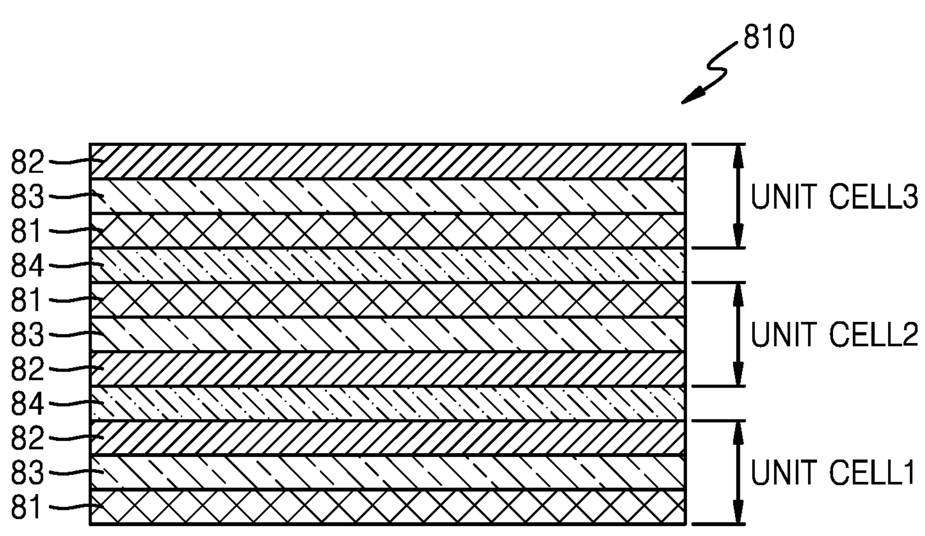
FIG. 8 schematically illustrates a structure of secondary battery according to other embodiments.

FIGS. 7 and 8 schematically illustrate cross-sectional structures of multilayer solid batteries according to embodiments.

As shown in FIG. 7, in a multilayer solid battery 710, unit cells 1 and 2 are stacked on one another with an internal current collecting layer 74 therebetween. The unit cells 1 and 2 each include a positive electrode layer 71, a solid electrolyte layer 73, and a negative electrode layer 72, which are sequentially stacked on one another. The positive electrode layer 71 contains the positive active material according to an embodiment.

The internal current collecting layer 74 is stacked with the negative electrode layer 72 of the unit cell 2 adjacent to one side (the upper surface in FIG. 7) of the internal current collecting layer 74 and the negative electrode layer 72 of the unit cell 1 adjacent to the other side (the lower surface in FIG. 7) of the internal current collecting layer 74. Although in FIG. 7, the internal current collector layer 74 is arranged to contact the negative electrode layer 72 of each of the unit cells 1 and 2, the internal current collector layer 74 may be arranged to contact the positive electrode layer 71 of each of the unit cells 1 and 2. The internal current collector layer 74 includes an electronic conductive material. The internal current collector layer 74 may further include an ionically conductive material. When an ionically conductive material is further included, excellent voltage stabilization characteristics may be achieved.

Since in the solid battery 710 according to an embodiment configured as described above, the same polar electrode is arranged on the opposite sides of the internal current collector, a monopolar multilayer solid battery 710 in which a plurality of unit cells are connected in parallel with the internal current collector layer 74 interposed therebetween. Thus, the multilayer solid battery 710 having high capacity may be obtained.

In addition, since in the multilayer solid battery 710, the internal current collecting layer 74 interposed between the unit cells 1 and 2 includes an electronically conductive material, adjacent to unit cells can be electrically connected in parallel, and at the same time, the positive electrode layers 71 or negative electrode layers 72 of two adjacent unit cells may be connected to be ionically conductive. This enables the potentials of the adjacent positive electrode layers 71 or negative electrode layers 72 to be averaged through the internal current collecting layer 74, and thus a stable output voltage can be obtained.

In addition, the unit cells constituting the multilayer solid battery 710 may be electrically connected in parallel, without an external current collecting member such as withdrawal tabs. Thus, the multilayer solid battery 710 having excellent space utilization and cost-efficiency may be obtained.

Referring to FIG. 8, a laminate contains a positive electrode layer 81, a negative electrode layer 82, a solid electrolyte layer 83, and an internal current collecting layer 84. Such laminates are stacked on one another and pressed by heat to obtain a multilayer solid battery 810. The positive electrode layer 81 is formed as one sheet for a positive electrode layer, and the negative electrode layer 82 is formed as two sheets for a negative electrode layer. The positive electrode layer 81 contains the positive active material according to any of the embodiments.

Figure 9A:
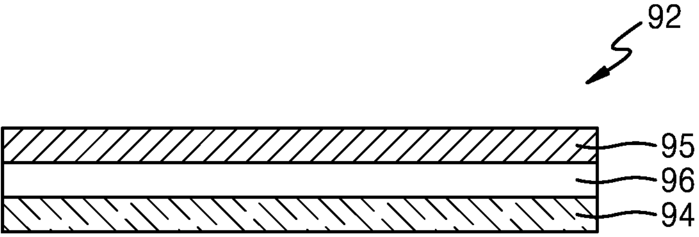
FIG. 9A schematically illustrates a structure of a secondary battery according to other embodiments.
Figure 9B:
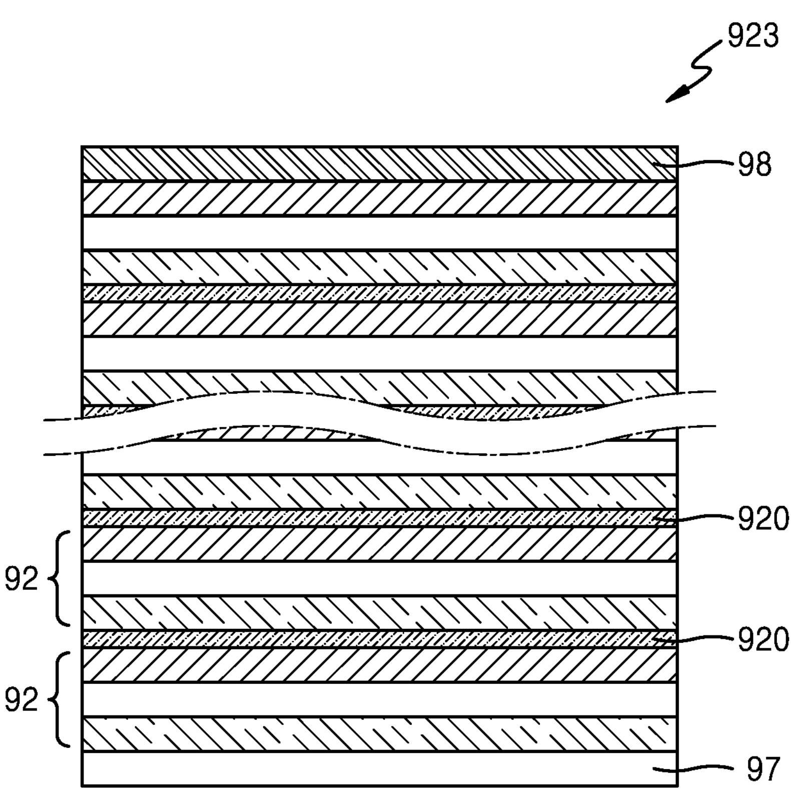
FIG. 9B schematically illustrates a structure of a secondary battery according to other embodiments.

FIGS. 9A and 9B illustrate laminates of all-solid-state secondary batteries according to embodiments. Positive electrode material layers in FIGS. 9A and 9B include the electrode active material according to any of the embodiments.

FIG. 9A illustrates a structure of a basic cell unit 92 constituting an all-solid state secondary battery is shown. The cell unit 92 has a structure in which a positive active material layer 94, an ionically conductive inorganic material layer 96, and a negative electrode active material layer 95 are arranged in sequence in this stated order.

FIG. 9B illustrates a structure of a laminate constituting an all-solid-state secondary battery.

In the all-solid-state secondary battery, a positive electrode-extraction electrode in contact with a positive electrode active material layer is mounted on the bottom end of the all-solid-state secondary battery, and a negative electrode-extraction electrode in contact with a negative electrode active material layer is mounted on the top end thereof. As used herein, the top and bottom represent a relative positional relationship.

A laminate 923 has a structure in which a plurality of cell units 92 are stacked on one another such that a positive electrode active material layer 94 and a negative electrode active material layer 95 face each other, and current collector layers are respectively provided on the uppermost and lowermost layers. Any one of the current collectors on the uppermost and lowermost layers contacts a positive electrode active material layer to act as a positive electrode current collector, and the other one contacts a negative active material layer to act as a negative electrode current collector. The current collector layer 97 of the uppermost layer contacts a positive electrode active material layer 94 and becomes a positive electrode current collector, and the current collector layer 98 of the uppermost layer contacts a negative active material layer 95 and becomes a negative electrode current collector.

In this embodiment, the current collector layers may function as extraction electrodes. In FIG. 9B, the current collector layer 97 of the lowermost layer may function as a positive electrode extraction electrode, and the current collector layer 98 of the uppermost layer may function as a negative electrode withdrawing electrode. Alternatively, separate extraction electrodes may be mounted on the current collector layers, respectively. For example, a positive extraction electrode that contacts the current collector layer 97 may be mounted on the bottom, and a negative electrode extraction electrode that contacts the current collector layer 98 may be mounted on the top.

The laminate 923 has a structure in which cell units 92 are stacked on one another with a metal layer 920 interposed therebetween, as shown in FIG. 9B. By the interposition of the metal layers, movement of ions is restricted within single cell units, and further ensured functioning as a serial-type all-solid-state secondary battery is expected. Although the laminate 923 of FIG. 9B includes the current collector layers, the current collector layers may be any current collectors as described above.

In the laminate of the all-solid-state secondary battery, when the number of cell units 92 is two or more, a so-called serial-type all-solid-state secondary battery may be obtained. The number of unit cells may be varied in a wide range based on the capacity or voltage value of a required all-solid-state secondary battery.

In an embodiment, the secondary battery may be an all-solid-state secondary battery. Hereinafter, the all-solid-state secondary battery according to embodiments will be described in greater detail with reference to the appended drawings.

Figure 10:
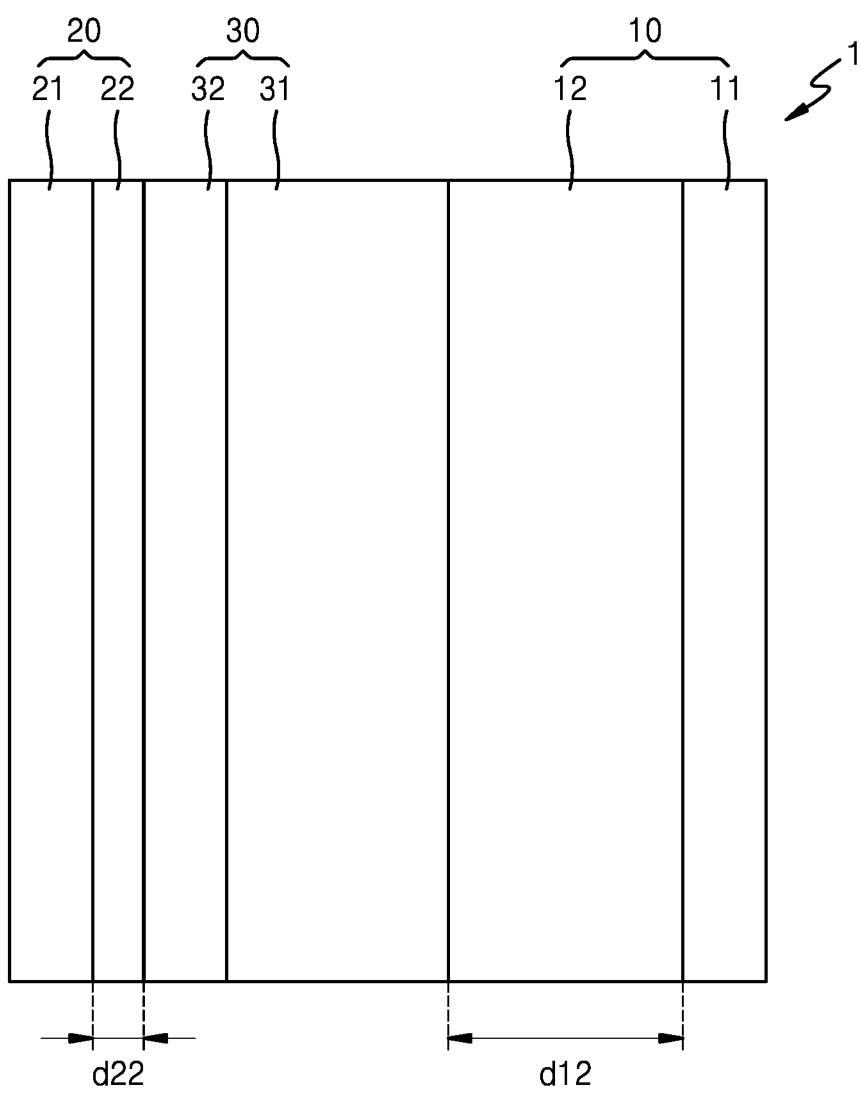
FIG. 10 is a cross-sectional view of an all-solid-state secondary battery according to an embodiment.
Figure 11:
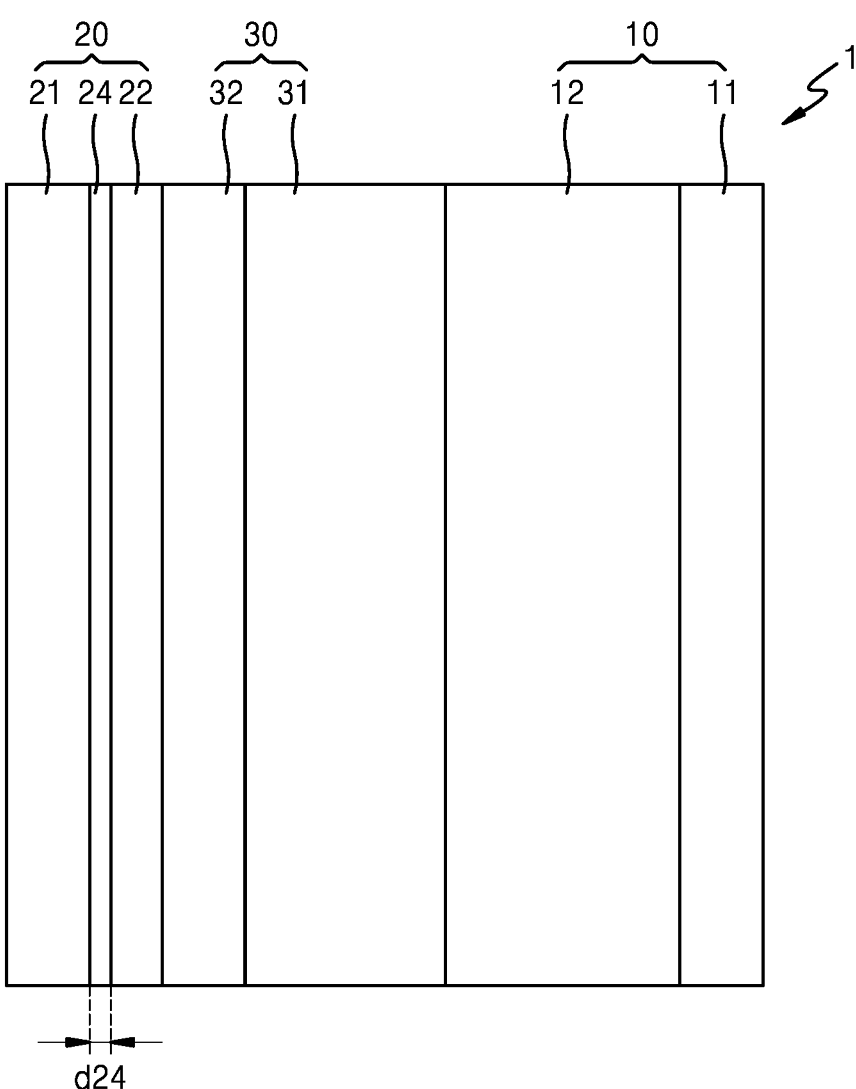
FIG. 11 is a cross-sectional view of an all-solid-state secondary battery according to other embodiments.
Figure 12:
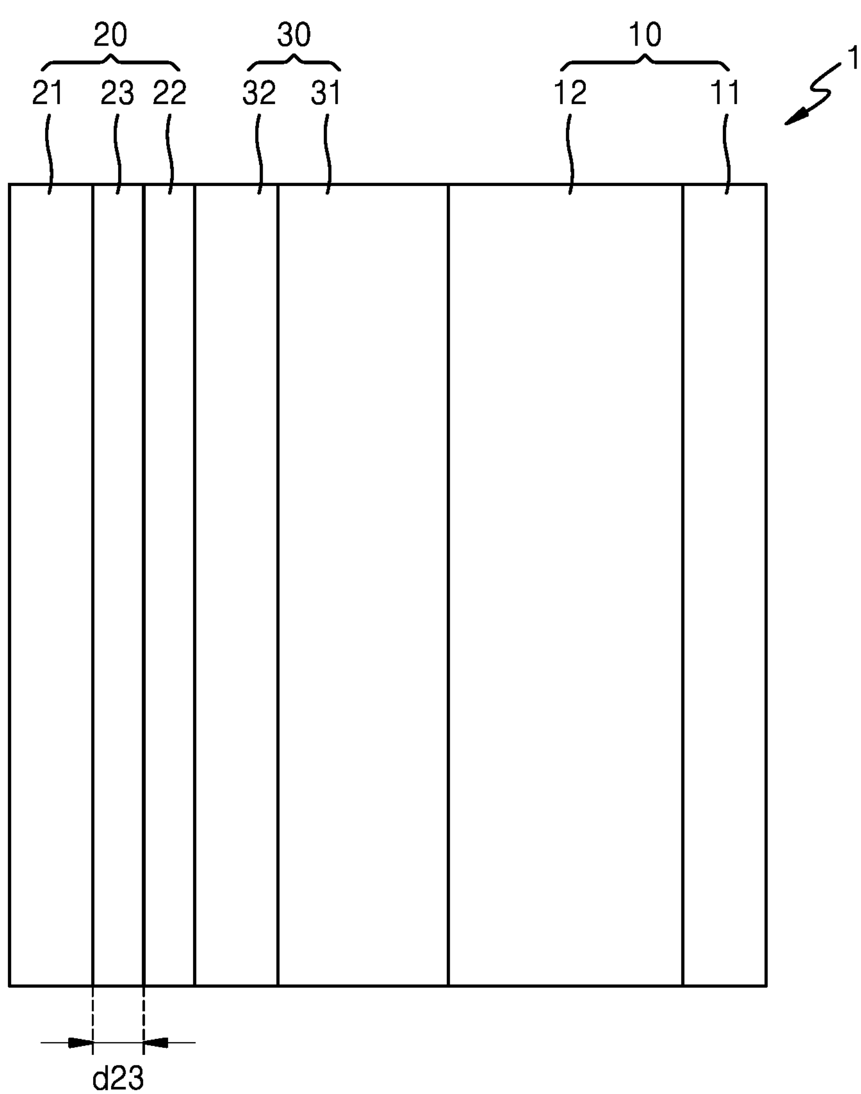
FIG. 12 is a cross-sectional view of an all-solid-state secondary battery according to other embodiments.

Referring to FIGS. 10 to 12, an all-solid-state secondary battery 1 contains: a negative electrode layer 20 including a negative electrode current collector layer 21 and a first negative electrode active material layer 22; a positive electrode layer 10 including a positive electrode current collector layer 11 and a positive electrode active material layer 12; and a solid electrolyte layer 30 arranged between the negative electrode layer 20 and the positive electrode layer 10. The positive electrode layer 10 may contain a solid electrolyte. The positive electrode active material layer and/or negative electrode active material layer of FIGS. 10 to 12 may contain the electrode active material according to any of the embodiments.

The positive electrode layer may contain, for example, the above-described positive electrode active material, a solid electrolyte, and a conducting agent.

(Negative Electrode Layer)

Referring to FIGS. 10 to 12, a negative electrode layer 20 includes a negative electrode current collector layer 21 and a first negative electrode active material layer 22. The first negative active material layer 22 includes a negative electrode active material. The negative electrode current collector layer 21 may be omitted.

The negative electrode active material included in the first negative electrode active material layer 22 may be, for example, in the form of particles. The negative active material in the form of particles has an average particle diameter of, for example, 4 um or less, 3 um or less, 2 um or less, 1 um or less, or 900 nm or less. The negative active material in the form of particles has an average particle diameter of, for example, 10 nm to 4 um, 10 nm to 2 um, 10 nm to 1 um, or 10 nm to 900 nm. As the negative electrode active material has an average particle diameter within these ranges, this may further facilitate reversible intercalation and/or deintercalation of lithium during charging and discharging. The average particle diameter of the negative electrode active material is, for example, a median diameter (D50) measured using a laser particle size distribution analyzer.

The negative electrode active material layer included in the first negative active material layer 22 includes, for example, one or more selected from a carbonaceous negative electrode active material and a metal or metalloid negative electrode active material.

In particular, the carbonaceous negative electrode active material is amorphous carbon. The amorphous carbon is, for example, carbon black (CB), acetylene black (AB), furnace black (FB), ketjen black (KB), graphene, and the like, but is not necessarily limited thereto, and may be any material classified as amorphous carbon in the art. The amorphous carbon, which is carbon having no or very low crystallinity, is distinguished from crystalline carbon or graphitic carbon.

The metal or metalloid negative electrode active material includes one or more selected from the group consisting of gold (Au), platinum (Pt), palladium (Pd), silicon (Si), silver (Ag), aluminum (Al), bismuth (Bi), tin (Sn), and zinc (Zn), but not necessarily limited thereto, and may be any material used as a metal negative electrode active material or metalloid negative electrode active material that forms an alloy or compound with lithium in the art. For example, nickel (Ni) does not form an alloy with lithium, and thus is not a metal negative electrode active material.

The first negative electrode active material layer 22 includes a negative electrode active material selected from these negative electrode active materials, or a mixture of a plurality of different negative electrode active materials. For example, the first negative electrode active material layer 22 includes amorphous carbon alone, or one or more selected from the group consisting of gold (Au), platinum (Pt), palladium (Pd), silicon (Si), silver (Ag), aluminum (Al), bismuth (Bi), tin (Sn), and zinc (Zn). Unlike this, the first negative electrode active material layer 22 includes a mixture of amorphous carbon and one or more selected from the group consisting of gold (Au), platinum (Pt), palladium (Pd), silicon (Si), silver (Ag), aluminum (Al), bismuth (Bi), tin (Sn), and zinc (Zn). A mixed ratio of amorphous carbon and, for example, gold, may be, by weight ratio, for example, 10:1 to 1:2, 5:1 to 1:1, or 4:1 to 2:1, but not necessarily limited thereto, and may be selected according to required characteristics of the all-solid-state secondary battery 1. As the negative electrode active material has such a composition, the all-solid-state secondary battery 1 has further improved cycle characteristics.

The negative electrode active material included in the first negative electrode active material layer 22 includes, for example, a mixture of first particles consisting of amorphous carbon and second particles consisting of a metal or metalloid. The metal or metalloid includes, for example, gold (Au), platinum (Pt), palladium (Pd), silicon (Si), silver (Ag), aluminum (Al), bismuth (Bi), tin (Sn), and zinc (Zn). In other embodiments, the metalloid is a semiconductor. The amount of the second particles is 8 to 60 wt %, 10 to 50 wt %, 15 to 40 wt %, or 20 to 30 wt % with respect to the total weight of the mixture. As the amount of the second particles is within these ranges, for example, the all-solid-state secondary battery 1 has further improved cycle characteristics.

The first negative electrode active material layer 22 includes, for example, a binder. The binder is, for example, styrene-butadiene rubber (SBR), polytetrafluoroethylene (PTFE), polyvinylidene fluoride (PVDF), polyethylene, vinylidene fluoride/hexafluoropropylene copolymers, polyacrylonitrile, polymethyl methacrylate, or the like, but not limited thereto, and may be any one available as a binder in the art. The binder may include a binder alone or a plurality of different binders.

By the inclusion of a binder in the first negative electrode active material layer 22, the first negative electrode active material layer 22 is stabilized on the negative electrode current collector 21. In addition, despite a change in volume and/or relative position of the first negative electrode active material layer 22 during charging and discharging, cracking of the first negative electrode active material layer 22 is suppressed. For example, in a case where the first negative electrode active material layer 22 does not include a binder, the first negative electrode active material layer 22 may be easily separated from the negative electrode current collector 21. As a portion of the negative electrode current collector 21 from which the first negative electrode active material layer 22 is separated is exposed to contact with the solid electrolyte layer 30, the likelihood of a short circuit is increased. The first negative electrode active material layer 22 is formed by, for example, coating, on the negative electrode current collector 21, a slurry in which materials constituting the first negative electrode active material layer 22 are dispersed, and drying the slurry. By inclusion of a binder in the first negative electrode active material layer 22, stable dispersion of negative electrode active material in the slurry is possible. For example, in a case where the slurry is coated on the negative electrode current collector 21 by screen printing, it is possible to suppress clogging of the screen (for example, clogging caused by aggregates of the negative electrode active material).

The thickness (d22) of the first negative electrode active material layer is, for example, 50% or less, 30% or less, 10% or less, or 5% or less of the thickness (d12) of the positive electrode material layer. The thickness (d22) of the first negative electrode active material layer is, for example, 1 um to 20 um, 2 um to 10 um, or 3 um to 7 um. When the thickness (d22) of the first negative electrode active material layer is within these ranges, the all-solid-state secondary battery 1 has excellent cycle characteristics.

The charge capacity of the first negative electrode active material layer 22 is, for example, 50% or less, 40% or less, 30% or less, 20% or less, 10% or less, 5% or less, or 2% or less of the charge capacity of the positive electrode active material layer. The charge capacity of the first negative electrode active material layer 22 is, for example, 0.1% to 50%, 0.1% to 40%, 0.1% to 30%, 0.1% to 20%, 0.1% to 10%, 0.1% to 5%, or 0.1% to 2% of the charge capacity of the positive electrode active material layer 12. When the charge capacity of the first negative electrode active material layer 22 is within these ranges, the all-solid-state secondary battery 1 has excellent cycle characteristics. The charge capacity of the positive active positive electrode active material layer 12 is obtained by multiplying the charge-capacity density (mAh/g) of the positive electrode active material by mass of the positive electrode active material in the positive electrode active material layer 12. For example, the negative electrode current collector 21 consists of materials that do not react with lithium, that is, materials that form neither an alloy nor a compound. Materials constituting the negative electrode current collector 21 are, for example, copper (Cu), stainless steel, titanium (Ti), iron (Fe), cobalt (Co), nickel (Ni), and the like, but are not necessarily limited thereto. Any materials that are used for an electrode current collector in the art are possible. The negative electrode current collector 21 may consist of one of the above-described metals, or may consist of an alloy or coating material of two or more metals. The negative electrode current collector 21 is, for example, in the form of a plate or foil.

The first negative electrode active material layer 22 may further include additives used in the all-solid secondary battery 1, for example, a filler, a dispersant, or an ionically conductive agent.

Referring to FIG. 11, for example, the all-solid-state secondary battery 1 further includes, on the negative electrode current collector 21, a thin film 24 including an element capable of forming an alloy with lithium. The thin film 24 is disposed between the negative electrode current collector 21 and the first negative electrode active material layer 22. The thin film 24 includes, for example, an element capable of forming an alloy with lithium. The element capable of forming an alloy with lithium is, for example, gold, silver, zinc, tin, indium, silicon, aluminum, bismuth, or the like, but is not necessarily limited thereto, and can be any element known in the art capable of forming an alloy with lithium. The thin film 24 consists of one of these metals, or an alloy of different metals. As the thin film 24 is disposed on the negative electrode current collector 21, for example, a second negative electrode active material layer (not shown) deposited between the thin film 24 and the first negative electrode active material layer 22 is further planarized, and the all-solid-state secondary battery 1 may have further improved cycle characteristics.

The thin film 24 has a thickness (d24) of, for example, 1 nm to 800 nm, 10 nm to 700 nm, 50 nm to 600 nm, or 100 nm to 500 nm. When the thickness of the thin film 24 is within these ranges, the all-solid-state battery has excellent energy density and cycle characteristics. The thin film 24 may be disposed on the negative electrode current collector 21 by, for example, a vacuum deposition method, a sputtering method, or a plating method, but not necessarily limited to these methods, and any method known in the art capable of forming the thin film 24 is possible.

Referring to FIG. 12, the all-solid-state secondary battery 1 further includes a second positive electrode active material layer 23 formed, for example, between the negative electrode current collector 21 and the solid electrolyte layer 30 by charging. The all-solid-state secondary battery 1 further includes the second negative electrode active material layer 23 formed, for example, between the negative electrode current collector 21 and the first negative electrode active material layer 22 by charging. Although not illustrated, the all-solid-state secondary battery 1 further includes the second negative electrode active material layer 23 formed, for example, between the solid electrolyte layer 30 and the first negative electrode active material layer 22 by charging. Although not illustrated, the all-solid-state secondary battery 1 further includes the negative electrode active material layer 23 formed, for example, in the first negative electrode active material layer 22 by charging.

The second negative electrode active material layer 23 is a metal layer including lithium or a lithium alloy. The metal layer includes lithium or a lithium alloy. Accordingly, since the second negative electrode active material layer 23 is a metal layer containing lithium, it acts as, for example, a lithium reservoir. The lithium alloy is, for example, a Li—Al alloy, a Li—Sn alloy, a Li—In alloy, a Li—Ag alloy, a Li—Au alloy, a Li—Zn alloy, a Li—Ge alloy, a Li—Si alloy, and the like, but is not limited thereto, and may be any lithium alloy used in the art. The second negative electrode active material layer 23 may consist of one of these alloys or lithium, or may consist of different alloys.

The second negative electrode active material layer has a thickness (d23) of, for example, but not specifically limited to, 1 um to 1000 um, 1 um to 500 um, 1 um to 200 um, 1 um to 150 um, 1 um to 100 um, or 1 um to 50 um. When the thickness (d23) of the second negative electrode active material layer is within these ranges, the all-solid-state secondary battery has excellent cycle characteristics. The second negative electrode active material layer 23 may be, for example, a metal foil having a thickness within these ranges.

In the all-solid-state secondary battery 1, for example, the second negative electrode active material layer 23 may be disposed between the negative electrode current collector 21 and the first negative electrode active material layer 22 before assembly of the all-solid-state secondary battery 1, or may be deposited between the negative electrode current collector 21 and the first negative electrode active material layer 22 by charging, after assembly of the all-solid-state secondary battery 1.

In a case where the second negative electrode active material layer 23 is disposed between the negative electrode current collector 21 and the first negative electrode active material layer 22 before assembly of the all-solid-state secondary battery 1, the second negative electrode active material layer 23, which is a metal layer including lithium, acts as a lithium reservoir. The all-solid-state secondary battery 1 including the second negative electrode active material layer 23 has further improved cycle characteristics. For example, before assembly of the all-solid-state secondary battery 1, a lithium foil is disposed between the negative electrode current collector 21 and the first negative electrode active material layer 22.

In a case where the second negative electrode active material layer 23 is formed by charging after assembly of the all-solid-state secondary battery 1, the all-solid-state secondary battery 1 may have increased energy density, as the all-solid-state secondary battery 1 does not include the second negative electrode active material layer 23 during assembly. For example, in charging the all-solid-state secondary battery 1, the all-solid-state secondary battery 1 is charged to exceed the charge capacity of the first negative electrode active material layer 22. That is, the first negative electrode active material layer 22 is overcharged. At the initial stage of charging, lithium deposition occurs in the first negative electrode active material layer 22. That is, the negative electrode active material included in the first negative electrode active material layer 22 forms an alloy or compound with lithium ions that migrate from the positive electrode layer 10. When charging is performed to exceed the capacity of the first negative electrode active material layer 22, for example, lithium precipitates on the rear surface of the first negative electrode active material layer 22, i.e., between the negative electrode current collector 21 and the first negative electrode active material layer 22, and a metal layer corresponding to the second negative electrode active material 23 is formed from the precipitated lithium. The second negative electrode active material layer 23 is a metal layer consisting of, mainly, lithium (i.e., metal lithium). These results are obtained since the negative electrode active material included in the first negative active material layer 22 consists of a material capable of forming an alloy or compound with lithium. During discharging, lithium in the first negative electrode active material layer 22 and the second negative electrode active material layer 23, i.e., metal layers, is ionized and migrate toward the positive electrode layer 10. Accordingly, in the all-solid-state secondary battery 1, it is possible to use lithium as the negative electrode active material. In addition, since the first negative electrode active material layer 22 covers the second negative electrode active material layer 23, the first negative electrode active material layer 22 serves as a protective layer for the second negative electrode active material layer 23, that is, a metal layer, and also to inhibit precipitation and growth of lithium dendrites. Accordingly, a short circuit and capacity reduction in the all-solid secondary battery 1 are suppressed, and as a result, the all-solid secondary battery 1 has improved cycle characteristics. In addition, in a case where the second negative electrode active material layer 23 is formed by charging after the all-solid secondary battery 1 is assembled, the negative electrode current collector 21, the first negative electrode active material layer 22, and a region therebetween are, for example, Li-free regions that do not contain lithium (Li) metal or a lithium (Li) alloy in the initial state or after discharge of the all-solid secondary battery.

Referring to FIG. 12, the all-solid-state secondary battery 1 has a structure in which the second negative electrode active material layer 23 is disposed on the positive electrode current collector 21 and the solid electrolyte layer 30 is disposed directly on the second negative electrode active material layer 23. The second negative electrode material layer 23 is, for example, a lithium metal layer or a lithium alloy layer.

(Solid Electrolyte Layer)

Referring to FIGS. 10 to 12, the solid electrolyte layer may contain an oxide-based solid electrolyte.

The oxide-based solid electrolyte is, for example, one or more selected from among $Li_{1+x+y}Al_xTi_{2-x}Si_yP_{3-y}O_{12}$ (wherein $0<x<2$ and $0\leq y<3$), $BaTiO_3$, $Pb(Zr,Ti)O_3$ (PZT), $Pb_{1-x}La_xZr_{1-y}Ti_yO_3$ (PLZT) (wherein $0\leq x<1$ and $0\leq y<1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, $Li_3PO_4$, $Li_xTi_y(PO_4)_3$ (wherein $0<x<2$ and $0<y<3$), $Li_xAl_yTi_z(PO_4)_3$ (wherein $0<x<2$, $0<y<1$, and $0<z<3$), $Li_{1+x+y}(Al, Ga)_x(Ti, Ge)_{2-x}Si_yP_{3-y}O_{12}$ (wherein $0\leq x\leq 1$ and $0\leq y\leq 1$), $Li_xLa_yTiO_3$ (wherein $0<x<2$ and $0<y<3$), $Li_2O$, LiOH, $Li_2CO_3$, $LiAlO_2$, $Li_2O$—$Al_2O_3$—$SiO_2$—$P_2O_5$—$TiO_2$—$GeO_2$, $Li_{3+x}La_3M_2O_{12}$ (wherein M is Te, Nb or Zr, and x is an integer of 1 to 10).

The oxide-based solid electrolyte is, for example, a Garnet-type solid electrolyte selected from among $Li_7La_3Zr_2O_{12}$ (LLZO) and $Li_{3+x}La_3Zr_{2-a}M_aO_{12}$ (M doped LLZO, wherein M is Ga, W, Nb, Ta, or Al, and x is an integer of 1 to 10, and $0.05\leq a\leq 0.7$).

In an embodiment, the solid electrolyte layer includes a LLZO solid electrolyte. The solid electrolyte layer may contain, for example, $Li_7La_3Zr_2O_{12}$ (LLZO), $Li_{6.4}La_3Zr_{1.7}W_{0.3}O_{12}$, $Li_{6.5}La_3Zr_{1.5}Ta_{0.3}O_{12}$, $Li_7La_3Zr_{1.7}W_{0.3}O_{12}$, $Li_{4.9}La_{2.5}Ca_{0.5}Zr_{1.7}Nb_{0.3}O_{12}$, $Li_{4.9}Ga_{2.1}La_3Zr_{1.7}W_{0.3}O_{12}$, $Li_{6.4}La_3Zr_{1.7}W_{0.3}O_{12}$, $Li_7La_3Zr_{1.5}W_{0.5012}$, $Li_7La_{2.75}Ca_{0.25}Zr_{1.75}Nb_{0.25}O_{12}$, $Li_7La_3Zr_{1.5}Nb_{0.5}O_{12}$, $Li_7La_3Zr_{1.5}Ta_{0.5}O_{12}$, $Li_{6.272}La_3Zr_{1.7}W_{0.3}O_{12}$, $Li_{5.39}Ga_{1.61}La_3Zr_{1.7}W_{0.3}O_{12}$, $Li_{6.5}La_3Zr_{1.5}Ta_{0.3}O_{12}$, or a combination thereof.

(Positive Electrode Layer)

The positive electrode layer 10 includes a positive electrode current collector 11 and a positive electrode active material layer 12.

The positive electrode current collector 11 includes, for example, a plate or foil consisting of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The positive electrode current collector 11 may be omitted.

The positive electrode active material layer 12 includes a positive electrode active material and a solid electrolyte. The solid electrolyte included in the positive electrode layer 10 is similar to or different from the solid electrolyte included in the solid electrolyte layer 30. For further details on the solid electrolyte, refer to the above description of the solid electrolyte layer 30. According to an embodiment, the solid electrolyte may contain an oxide-based solid electrolyte.

The positive electrode layer contains a positive electrode active material, which is the electrode active material according to any of the embodiments.

The positive electrode active material is in the form of particles, for example, spherical or elliptical particles. The particle diameter of the positive electrode active material is not particularly limited, and is within a range applicable to the positive electrode active material of a conventional all-solid secondary battery. The amount of the positive electrode active material of the positive electrode layer 10 is not particularly limited, and is within a range applicable to the positive electrode layer of a conventional all-solid secondary battery.

The positive electrode layer 10 may further include additives, for example, a conductive agent, a binder, a filler, a dispersant, an ionically conductive auxiliary agent, in addition to the positive electrode active material and the solid electrolyte described as described above. The conductive agent is, for example, graphite, carbon black, acetylene black, Ketjen black, carbon fiber, metal powder, and the like. The binder is, for example, styrene butadiene rubber (SBR), polytetrafluoroethylene, polyvinylidene fluoride, polyethylene, and the like. A coating agent, a dispersant, an ionically conductive auxiliary agent, and the like, which can be blended in the positive electrode layer 10, are known materials generally used for an electrode of a solid secondary battery.

A method of manufacturing an all-solid secondary battery includes laminating a solid electrolyte layer 30 on the positive electrode layer 10 and laminating a negative electrode layer 20 on the positive electrode layer 10.

According to another embodiment, the solid electrolyte layer 30 may be prepared in a sheet form by coating and drying, on a separate substrate, a composition for forming a solid electrolyte layer and separating from the substrate. The solid electrolyte layer 30 may be in the form of a sheet including the substrate. Non-limiting examples of the substrate may be a polyethylene terephthalate film, a polyethylene nonwoven fabric, or the like.

According to another embodiment, the solid electrolyte layer 30 may be formed by coating and drying or by transferring a composition for forming a first solid electrolyte layer on the negative electrode layer 10.

Subsequently, the positive electrode layer, the solid electrolyte layer, and the negative electrode layer are packaged with a packaging material and then pressed to manufacture an all-solid-state battery. The pressing may be performed using roll pressing, hot pressing, warm isostatic pressing, or the like.

When roll pressing or hot pressing is used in the pressing, mass production is possible and a tight contact interface may be formed during compression of the electrode layer and the solid electrolyte layer.

(Manufacture of Negative Electrode Layer)

A negative electrode active material, a conductive material, a binder, a solid electrolyte, and the like, which are materials constituting the first negative electrode active material layer 22, are added to a polar solvent or a non-polar solvent to prepare a slurry. The prepared slurry is applied on the negative electrode current collector 21 and dried to prepare a first laminate. Then, the dried first laminate is pressed to prepare the negative electrode layer 20. The pressing may be performed, for example, using a roll press, a flat press, etc., but is not necessarily limited to these methods, and any pressing used in the art may be used. The pressing may be omitted.

The negative electrode layer includes a negative electrode current collector and a first negative electrode active material layer disposed on the negative electrode current collector and including a negative electrode active material. The negative electrode active material includes at least one selected from a carbonaceous negative electrode active material and a metal or metalloid negative electrode active material. The carbonaceous negative active material includes at least one selected from amorphous carbon and crystalline carbon. The metal or metalloid negative active material is one or more selected from the group consisting of gold (Au), platinum (Pt), palladium (Pd), silicon (Si), silver (Ag), aluminum (Al), bismuth (Bi), tin (Sn), and zinc (Zn).

A second negative electrode layer further includes a negative electrode active material layer arranged at least one of between the negative electrode collector and the first negative electrode active material layer and between the solid electrolyte layer and the first negative electrode active material layer, wherein the second negative electrode active material layer is a metal layer including lithium or a lithium alloy.

(Manufacture of Positive Electrode Layer)

A cathode active material, a conductive material, a binder, a solid electrolyte, and the like, which are materials constituting the cathode active material layer 12 are added to a non-polar solvent to prepare a slurry. As the positive electrode active material, the positive electrode active material according to any of the embodiments may be used. The prepared slurry is applied on the positive electrode current collector 11 and dried. The obtained laminate is pressed to thereby manufacture a positive electrode layer 10. The pressing is, for example, roll pressing, flat pressing, isostatic pressing, or the like, but is not necessarily limited to these methods, and any press methods used in the art may be used. The pressing may be omitted. In other embodiments, a mixture of materials that constitute the positive active material layer 12 is molded by compression into pellets or by stretching into a sheet form, to thereby manufacture the positive electrode layer 10. When the positive electrode layer 10 is manufactured using these methods, the positive electrode current collector 11 may be omitted.

(Manufacture of Solid Electrolyte Layer)

The solid electrolyte layer 30 is made of, for example, a solid electrolyte material formed of an oxide-based solid electrolyte material.

(Manufacture of all-Solid-State Secondary Battery)

The positive electrode layer 10, the negative electrode layer 20, and the solid electrolyte layer 30, which are manufactured by the above-described methods, are stacked such that the solid electrolyte layer 30 is arranged between the positive electrode layer 10 and the negative electrode layer 20 and then pressed to thereby manufacture the all-solid-state secondary battery 1.

For example, the solid electrolyte layer 30 is disposed on the positive electrode layer 10 to thereby prepare a second laminate. Subsequently, the negative electrode layer 20 is disposed on the second laminate such that the solid electrolyte layer 30 and the first negative electrode active material layer contact to thereby manufacture an all-solid-state secondary battery 1.

The structure of the all-solid-state secondary battery and the method of manufacturing the same as described so far are exemplary embodiments, and constituent members and manufacturing procedures thereof may be varied appropriately.

According to an embodiment, the all-solid-state secondary battery may be loaded on a small ITS or a large electric vehicle depending on the capacity and size of the all-solid-state secondary battery.

One or more embodiments of the present disclosure will now be described in detail with reference to the following examples. However, these examples are only for illustrative purposes and are not intended to limit the scope of the one or more embodiments of the present disclosure.

EXAMPLES

Preparation of Positive Electrode Active Material

Preparation Example 1

$Li_2CO_3$, CoO, NiO, and $(NH_4)_2HPO_4$ were mixed to obtain a precursor mixture, which was then mixed with ethanol and milled in a ball mill for 10 hours. The amounts of $Li_2CO_3$, CoO, NiO, and $(NH_4)_2HPO_4$ were stoichiometrically controlled so as to obtain a positive electrode active material having the composition as in Table 1, and 100 parts by weight of ethanol was used with respect to 100 parts by weight of the total amount of $Li_2CO_3$, CoO, NiO, and $(NH_4)_2HPO_4$.

The milling product was dried at 90° C. for 12 hours, and the dried product was heat-treated in air atmosphere at 750° C. for 12 hours to obtain $Li_6Co_4Ni_1(P_2O_7)_4$ as a positive electrode active material.

Preparation Examples 2-4

A positive electrode active material having the composition as in Table 1 was obtained in the same manner as in Preparation Example 1, except that in preparing a precursor mixture, the amounts of $Li_2CO_3$, CoO, NiO, and $(NH_4)_2HPO_4$ were stoichiometrically controlled to obtain the desired product having the composition as in Table 1.

Preparation Example 5

A positive electrode active material having the composition as in Table 1 was obtained in the same manner as in Preparation Example 1, except that in preparing a precursor mixture, $MnO_2$ was used instead of CoO.

Preparation Example 6

A positive electrode active material having the composition as in Table 1 was obtained in the same manner as in Preparation Example 1, except that in preparing a precursor mixture, $MnO_2$ was used instead of CoO, and the heat treatment temperature was varied to 700° C.

Preparation Example 7

A positive electrode active material having the composition as in Table 1 was obtained in the same manner as in Preparation Example 1, except that in preparing a precursor mixture, MnO and $V_2O_3$ were used instead of CoO, and the heat treatment temperature was varied to 600° C.

Comparative Preparation Example 1

A positive electrode active material having the composition as in Table 1 was obtained in the same manner as in Preparation Example 1, except that in preparing a precursor mixture, NiO was not used.

Comparative Preparation Example 2

A positive electrode active material having the composition as in Table 1 was obtained in the same manner as in Preparation Example 1, except that in preparing a precursor mixture, CoO was not used.

Comparative Preparation Example 3

$Li_2CO_3$, $FeC_2O_4{\cdot}2H_2O$, $NiC_2O_4$ $2H_2O$, and $(NH_4)_2HPO_4$ were put into a planetary ball mill container. Then, the planetary ball mill container was loaded on a ball mill, and the ball mill was operated to mix the raw materials. The amounts of $Li_2CO_3$, $FeC_2O_4{\cdot}2H_2O$, $NiC_2O_4{\cdot}2H_2O$, and $(NH_4)_2HPO_4$ were stoichiometrically controlled so as to obtain a desired product as in Table 1.

The mixture obtained according to the process described above was subjected to calcination at 800° C. under an argon atmosphere for 6 hours to obtain the positive active material having the composition as in Table 1.

Comparative Preparation Examples 4-5

Positive electrode active materials having the compositions as in Table 1 were obtained in the same manner as in Comparative Preparation Example 3, except that the amounts of $Li_2CO_3$, $FeC_2O_4{\cdot}2H_2O$, $NiC_2O_4$ 2 $H_2O$, and $(NH_4)_2HPO_4$ were stoichiometrically controlled so as to obtain desired products as in Table 1.

TABLE 1

| Preparation Example | Composition | Heat-treatment temperature (° C.) |
|---|---|---|
| Preparation Example 1 | $Li_6Co_4Ni_1(P_2O_7)_4$ | 750 |
| Preparation Example 2 | $Li_6Co_3Ni_2(P_2O_7)_4$ | 750 |
| Preparation Example 3 | $Li_6Co_2Ni_3(P_2O_7)_4$ | 750 |
| Preparation Example 4 | $Li_6Co_1Ni_4(P_2O_7)_4$ | 750 |
| Preparation Example 5 | $Li_6Mn_2Ni_3(P_2O_7)_4$ | 750 |
| Preparation Example 6 | $Li_6Mn_3Ni_2(P_2O_7)_4$ | 700 |
| Preparation Example 7 | $Li_6Mn_2V_1Ni_2(P_2O_7)_4$ | 600 |
| Comparative Preparation Example 1 | $Li_6Co_5(P_2O_7)_4$ | 750 |
| Comparative Preparation Example 2 | $Li_6Ni_5(P_2O_7)_4$ | 750 |
| Comparative Preparation Example 3 | $Li_6Fe_{2.5}Ni_{2.5}(P_2O_7)_4$ ($Li_{4.5}Fe_{1.875}Ni_{1.875}(P_2O_7)_3$) | 800 |
| Comparative Preparation Example 4 | $Li_6Fe_{4.0}Ni_{1.0}(P_2O_7)_4$ | 800 |
| Comparative Preparation Example 5 | $Li_6Fe_{4.5}Ni_{0.5}(P_2O_7)_4$ | 800 |

$Li_6Ni_5(P_2O_7)_4$ obtained according to Comparative Preparation Example 2 had a high discharge voltage, but was difficult to maintain in a stable phase.

Figure 4A:
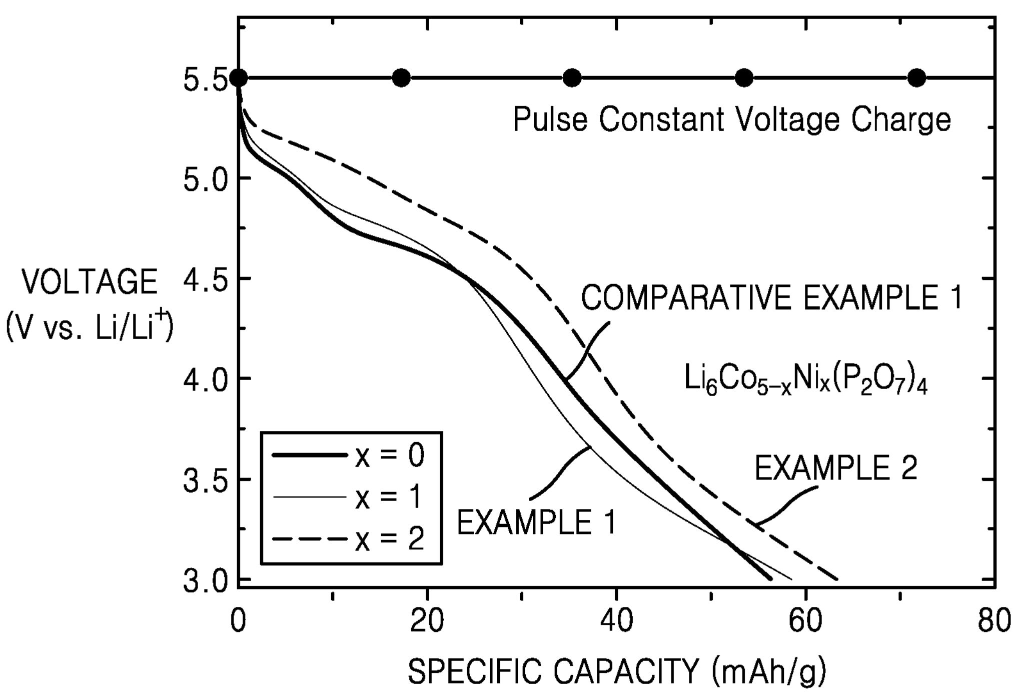
FIG. 4A shows changes in voltage with respect to specific capacity in the coin cells of Examples 1-2 and Comparative Example 1.
Figure 4B:
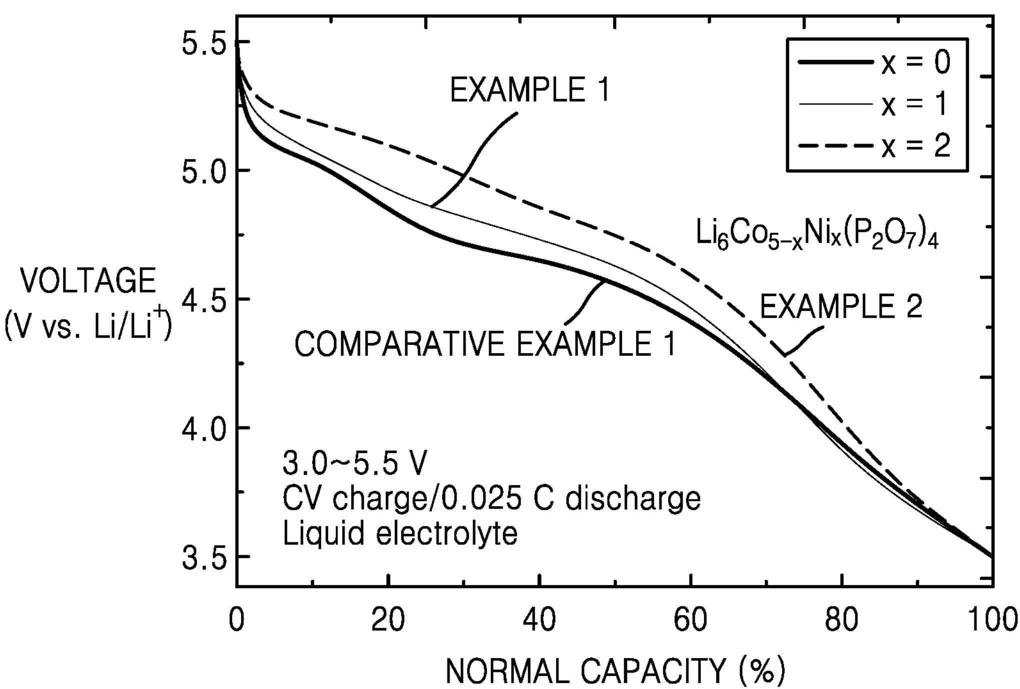
FIG. 4B shows discharge curves normalized with respect to capacity in the coin cells of Examples 1-2 and Comparative Example 1.
Figure 4C:
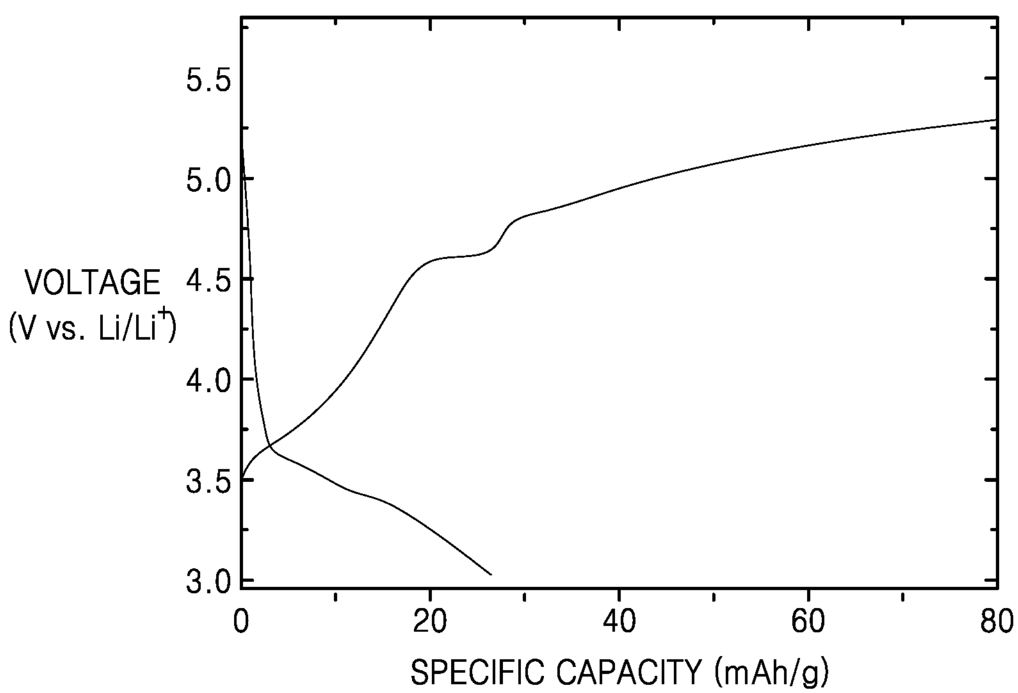
FIG. 4C shows changes in voltage with respect to specific capacity in a coin cell of Comparative Example 4.

For $Li_6Fe_{2.5}Ni_{2.5}(P_2O_7)_4$ obtained according to Comparative Preparation Example 3, a high-voltage discharge at 5V or greater did not occur as shown in FIG. 4C.

Preparation Examples 8-11

Positive electrode active materials having the compositions as in Table 2 were obtained in the same manner as in Preparation Example 1, except that in preparing a precursor mixture, titanium oxide ($TiO_2$), $Cr_2O_3$, CuO, and $Sc_2O_3$ were used, respectively, instead of CoO.

TABLE 2

| Preparation Example | Composition |
|---|---|
| Preparation Example 8 | $Li_6Ti_3Ni_2(P_2O_7)_4$ |
| Preparation Example 9 | $Li_6Cr_3Ni_2(P_2O_7)_4$ |
| Preparation Example 10 | $Li_6Cu_3Ni_2(P_2O_7)_4$ |
| Preparation Example 11 | $Li_6Sc_3Ni_2(P_2O_7)_4$ |

(Manufacture of lithium secondary battery)

Example 1

First, a positive electrode was manufactured according to the following procedure.

The positive electrode active material of Preparation Example 1, a conductive agent (Super-P; Timcal Ltd.), polyvinylidene fluoride (PVDF), and N-methylpyrrolidone were mixed to obtain a composition for forming a positive electrode material layer. In the composition for forming a positive electrode active material layer, a mixed ratio of $Li_6Co_4Ni_1(P_2O_7)_4$, the conductive agent, and PVDF was 50:30:20, and 20 g of N-methylpyrrolidone was used with respect to 1 g of the positive electrode active material.

The composition for forming a positive electrode active material was coated on an aluminum foil (having a thickness of about 15 μm) and dried at 25° C., and the dried product was further dried under vacuum at about 120° C. and roll-pressed to manufacture a positive electrode having a thickness of about 5 μm.

A 2032 type coin cell was manufactured using the positive electrode and a lithium metal counter electrode. A separator made of a porous polyethylene (PE) film (having a thickness of about 16 μm) was interposed between the positive electrode and the lithium metal counter electrode, and an electrolyte solution was injected to manufacture a lithium secondary battery as a 2032 type coin cell. A solution including 1.1M LiPFe dissolved in a mixed solvent of ethylene carbonate (EC) and ethylmethylcarbonate (EMC) in a volume ratio of 3:5 was used as the electrolyte solution.

Examples 2-11

Lithium secondary batteries were manufactured in the same manner as in Example 1, except that in preparing a positive electrode, the positive electrode active materials of Preparation Examples 2 to 11 were used, respectively, instead of the positive electrode active material of Preparation Example 1.

Comparative Examples 1-5

Lithium secondary batteries were manufactured in the same manner as in Example 1, except that in preparing a positive electrode, the positive electrode active materials of Comparative Preparation Examples 1 to 5 were used, respectively, instead of the positive electrode active material of Preparation Example 1.

Evaluation Example 1: X-Ray Diffraction Analysis

X-ray diffraction analysis was performed on the positive electrode active materials of Preparation Examples 1-4 and Comparative Preparation Examples 1-5. The X-ray diffraction analysis was performed using X'pert pro (PANalytical) with Cu Kα radiation (1.54056 Å).

Figure 1B:
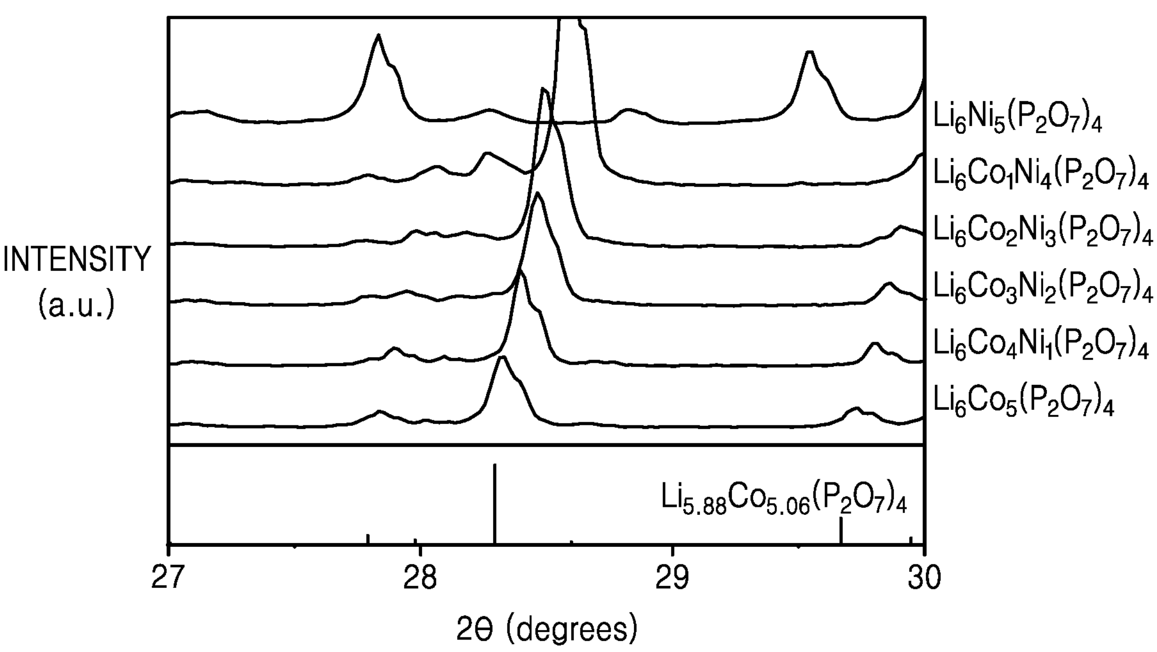
FIG. 1B is a magnified view of part of FIG. 1A.

The X-ray diffraction analysis results of the positive electrode active materials of Preparation Examples 1-4 and Comparative Preparation Examples 1-2 are shown in FIG. 1A. A magnified partial region of FIG. 1A is shown in FIG. 1B. The X-ray diffraction spectrum of $Li_{5.88}Co_{5.06}(P_2O_7)_4$ is shown as a reference in FIGS. 1A and 1B.

Referring to FIGS. 1A and 1B, it is found that the positive electrode active materials of Preparation Examples 1-4 were able to maintain a stable crystal phase by introduction of cobalt having high phase stability.

The positive electrode active material of Comparative Preparation Example 1 had stable phase stability, while the positive electrode active material of Comparative Preparation Example 2 was converted into other materials such as $Li_2Ni_3(P_2O_7)_2$ and $LiNiPO_4$ in a temperature range of 500 to 900° C. and exhibited very unstable phase stability.

An intensity ratio of the main peak to minor peak obtained by the X-ray diffraction analysis of the positive active materials of Preparation Examples 1 and 2 and the positive active material of Comparative Preparation Example 1 was calculated using equation 1 and presented in Table 3. Here, the main peak as a peak having the maximum absorption intensity appears in a region of a diffraction angle 2θ of 28.5°, and the minor peak as a peak having a relatively small peak than the main peak appears in a region of a diffraction angle 2θ of 14.3°.

$$\text{Peak intensity ratio}(P2/P1)=\text{Intensity of minor peak }(P2)/\text{Intensity of major peak}(P1) \quad \text{[Equation 1]}$$

TABLE 3

| Preparation Example | Intensity ratio (P2/P1) |
|---|---|
| Preparation Example 1 | 0.32 |
| Preparation Example 2 | 0.23 |
| Comparative Preparation Example 1 | 0.43 |

Referring to Table 3, it was found that the positive electrode active materials of Preparation Example 1 and 2 have distinct physical properties such as in crystallinity, from the positive active material of Comparative Preparation Example 1.

(2) Preparation Examples 5, 6 and 7

Figure 1C:
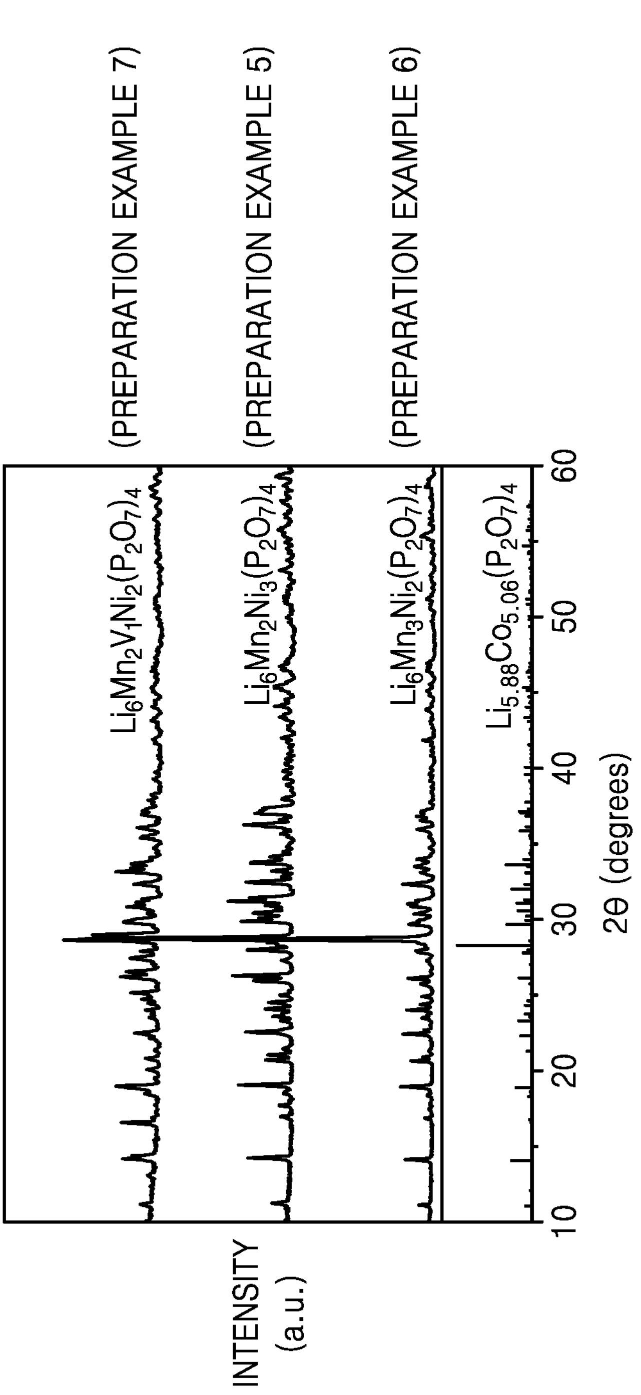
FIG. 1C shows X-ray diffraction analysis spectra of positive electrode active materials of Preparation Examples 5, 6, and 7.

The X-ray diffraction analysis spectra of the positive electrode active materials of Preparation Examples 5, 6, and 7 are shown in FIG. 1C. For reference, the X-ray diffraction spectrum of $Li_{5.88}Co_{5.06}(P_2O_7)_4$ is also shown in FIG. 1C.

Referring to FIG. 1C, it was found that the positive electrode active materials of Preparation Examples 5 to 7 had high phase stability due to the replacement of some sites of nickel with other transition metals such as manganese or vanadium.

(3) Preparation Example 6 and Comparative Preparation Example 1

Figure 1D:
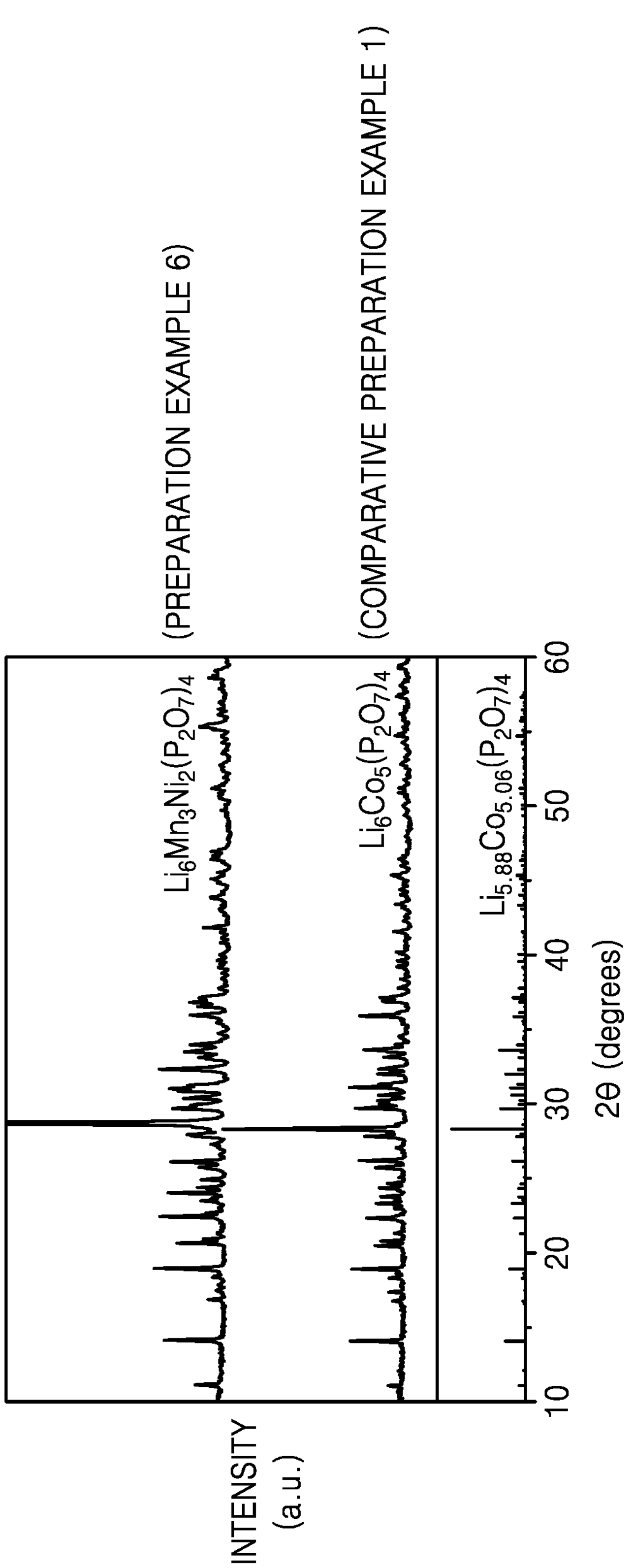
FIG. 1D shows X-ray diffraction analysis spectra of the positive electrode active materials of Preparation Example 6 and Comparative Preparation Example 1.

X-ray diffraction analysis spectra of the positive electrode active materials of Preparation Example 6 and Comparative Preparation Example 1 are shown in FIG. 1D. For reference, the X-ray diffraction spectrum of $Li_{5.88}Co_{5.06}(P_2O_7)_4$ is also shown in FIG. 1D.

Referring to FIG. 1D, it is found that the positive active material of Preparation Example 6 had high phase stability by replacement of some sites of nickel with manganese and vanadium.

(4) Comparative Preparation Examples 3-5

Figure 1E:
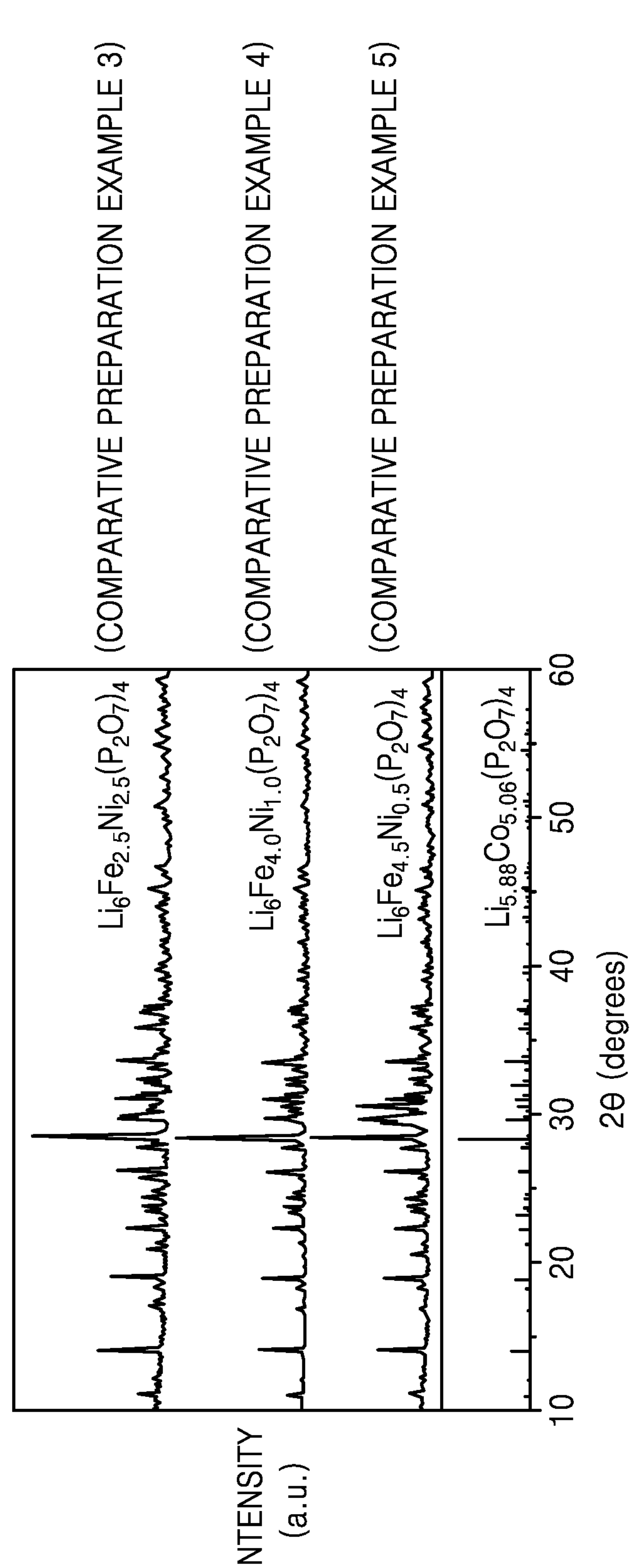
FIG. 1E shows X-ray diffraction analysis spectra of the positive electrode active materials of Comparative Preparation Examples 3 to 5.

X-ray diffraction analysis results of the positive active materials of Comparative Preparation Examples 3 to 5 are shown in FIG. 1E.

Referring to FIG. 1E, the positive active materials of Comparative Preparation Examples 3 to 5 had excellent phase stability. However, high-voltage characteristics were poor as shown in the graphs of changes in voltage with respect to specific capacity, which will be described later.

Evaluation Example 2: Voltage Calculation

The voltage with respect to mixed amounts of cobalt and nickel in the positive electrode active material $Li_6Co_{5-x}Nix(P_2O_7)_4$ was calculated. The voltage calculation was performed using quantum calculation. The quantum calculation was performed using density functional theory (DFT).

Figure 2:
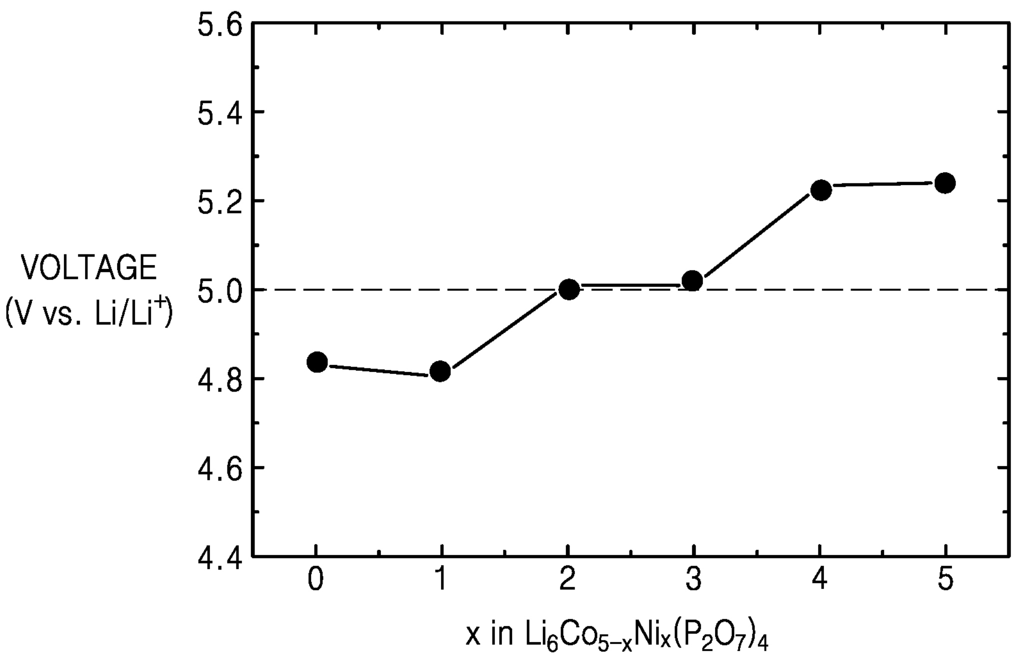
FIG. 2 shows calculated voltage change values according to mixed amounts of cobalt and nickel in positive electrode active materials.

The voltage calculation results are shown in FIG. 2.

Referring to FIG. 2, in order to utilize a positive electrode active material having high-voltage characteristics, by replacement of nickel in the positive electrode active material with cobalt having high phase stability, a high average voltage of 4.8 V or higher was achieved while the crystalline structure was stably maintained.

Evaluation Example 3: Charge/Discharge Characteristics (1) Examples 1-4 and Comparative Examples 1-2

The charge/discharge characteristics of the coin cells manufactured according to Examples 1-4 and Comparative Examples 1-2 were evaluated by the following charge-discharge test.

Charging and discharging were performed as follows: after rest at 25° C. for 5 hours, constant-current charging was performed at a current of 0.1 C until a voltage of 5.5 V was reached. The cell after completion of the charging was subjected to constant-current discharging at a current of 0.025 C until a voltage of 4.0V was reached.

This charge-discharge cycle was repeatedly performed 10 times in total. Parts of the results are illustrated in FIGS. 3A and 3B.

Figure 3A:
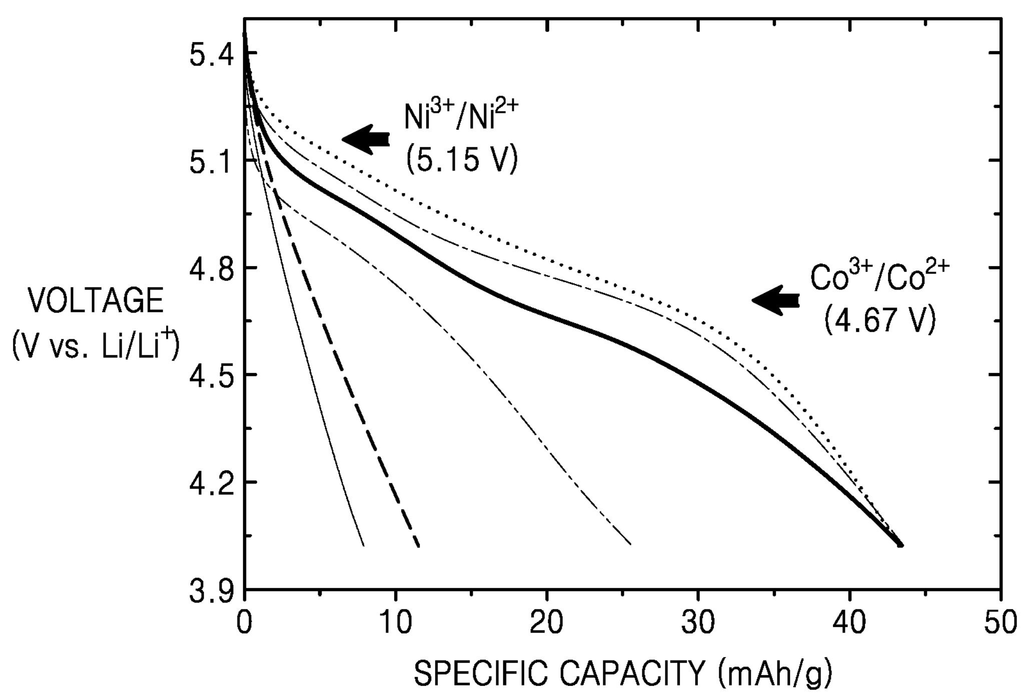
FIG. 3A shows changes in voltage with respect to specific capacity in coin cells manufactured according to Examples 1-4 and Comparative Examples 1-2.
Figure 3B:
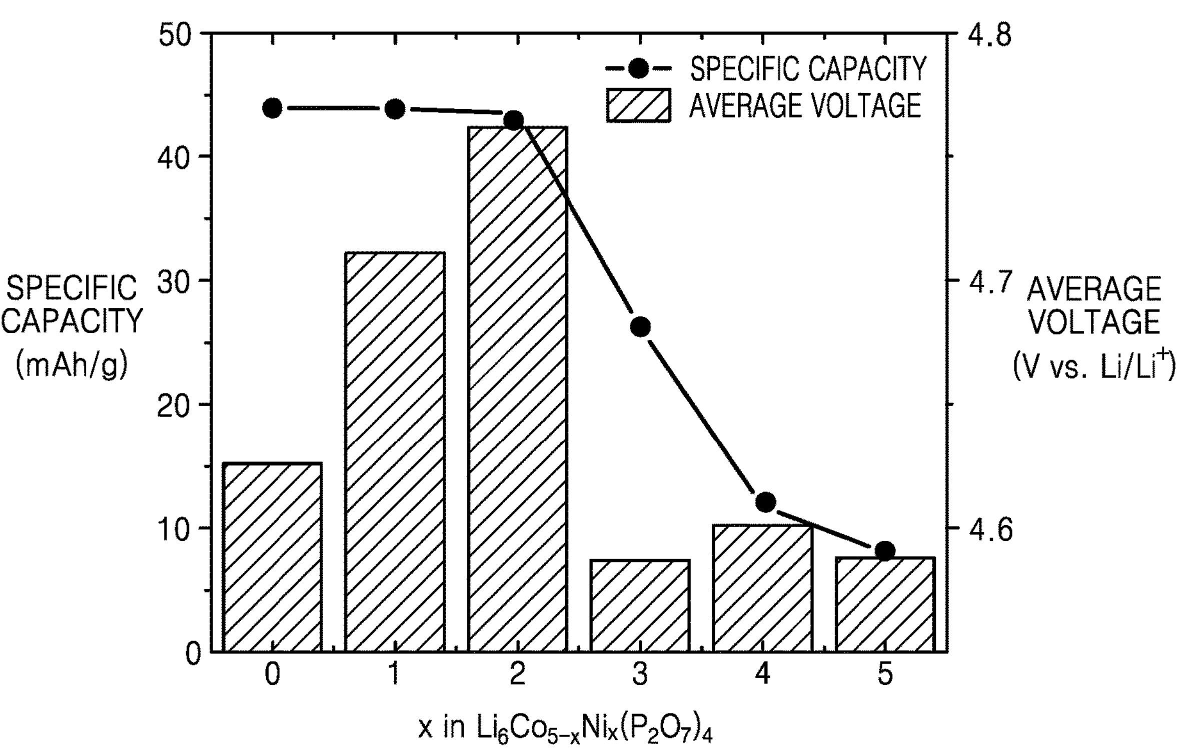
FIG. 3B shows specific capacity and average voltage in the coin cells of Examples 1-4 and Comparative Examples 1-2.

Referring to FIGS. 3A and 3B, the coin cells of Examples 1 to 5 exhibited excellent average voltage, specific capacity, and charge-discharge characteristics as compared to those of the coin cells of Comparative Examples 1 and 2.

In addition, the average voltage and specific capacity characteristics of the coin cells of Example 5-11 were evaluated in the same manner as the evaluation method of the coin cell of Example 1.

As a result of the evaluation, the average voltage and specific capacity characteristics of the coin cells of Examples 5-11 exhibited excellent results similar to those of the coin cell of Example 1.

(2) Examples 1-2 and Comparative Examples 3-5

Charge/discharge characteristics of the coin cells manufactured according to Examples 1-2 and Comparative Examples 3-5 were evaluated by the following charge-discharge test.

Charging and discharging were performed as follows: after rest at 25° C. for 5 hours, constant-current charging was performed at a current of 0.1 C until a voltage of 5.5 V was reached. The cell after completion of the charging was subjected to constant-current discharging at a current of 0.025 C until a voltage of 3.0V, 3.5V or 4.0V was reached.

Parts of the evaluation results of the first charge-discharge characteristics are shown in FIGS. 4A and 4B and Table 4.

FIG. 4A shows changes in voltage with respect to specific capacity in the coin cells of Examples 1-2 and Comparative Example 1, FIG. 4B shows discharge curves normalized with respect to capacity in the coin cells of Examples 1-2 and Comparative Example 1, and FIG. 4C shows changes in voltage with respect to specific capacity in a coin cell of Comparative Example 4.

TABLE 4

| Example | | Discharge voltage during charging/discharging (V) | | |
|---|---|---|---|---|
| | | 3.0 | 3.5 | 4.0 |
| Average discharge voltage (V) | Example 1 | 4.11 | 4.48 | 4.71 |
| | Example 2 | 4.27 | 4.60 | 4.81 |
| | Comparative Example 1 | 4.19 | 4.44 | 4.65 |

Referring to Table 4, the coin cells of Examples 1 and 2 were found to have increased average discharge voltages as compared with that of Comparative Example 1. Referring to FIGS. 4A and 4B, the coin cells of Examples 1 and 2 exhibit superior average voltage, specific capacity, and charge/discharge characteristics as compared with those of the coin cell of Comparative Example 1.

Referring to FIG. 4C, it was found that a high-voltage discharge at 5V or greater did not occur in the coin cell of Comparative Example 4. In addition, the coin cells of Comparative Examples 4 and 5 exhibited similar high-voltage discharge characteristics to those of the coin cell of Comparative Example 3.

Evaluation Example 4: dQ/dV Analysis

In the coin cells manufactured according to Example 1 and Comparative Examples 1-2, charge-discharge characteristics were evaluated using a charger/discharger (Manufacturer: TOYO, Model: TOYO-3100).

The charge/discharge characteristic evaluation process will be described in more detail as follows.

Charging and discharging were performed as follows: after rest at 25° C. for 5 hours, constant-current charging was performed at a current of 0.1 C until a voltage of 5.5 V was reached. The cell after completion of the charging was subjected to constant-current discharging at a current of 0.025 C until a voltage of 4.0V was reached. This charge-discharge cycle was repeatedly performed 10 times in total.

Figure 5:
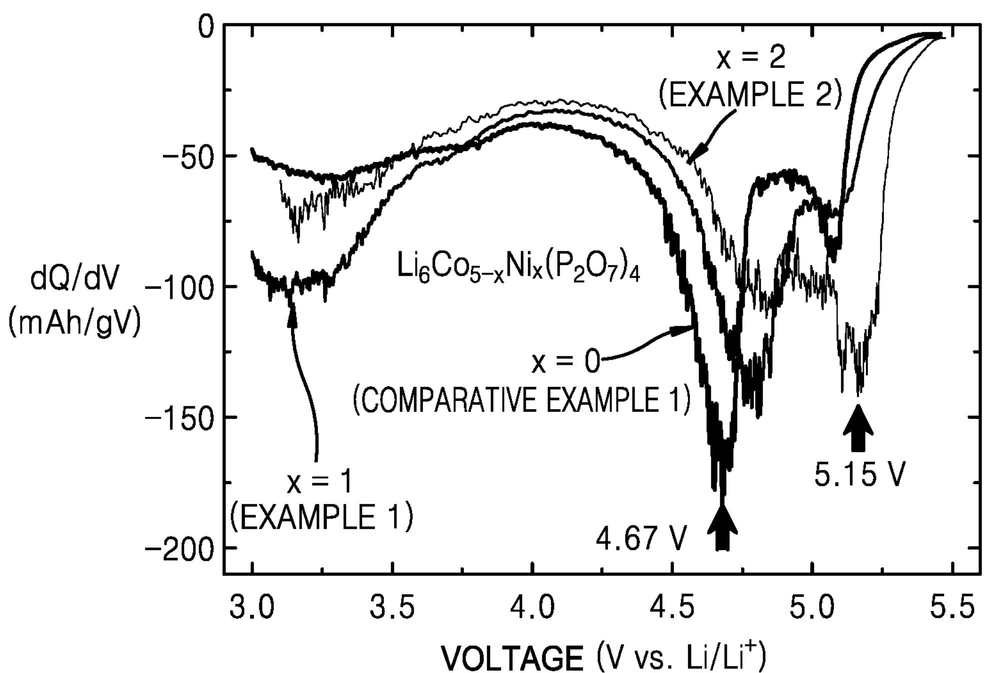
FIG. 5 shows a dQ/dV plot of the coin cells of Examples 1-2 and Comparative Example 1.

The position at which the main discharge peak appears and the area ratio of discharge curves obtained from dQ/dV charge/discharge differential curve distribution in a voltage range of 3.0V to 5.55V of the first cycle are shown in Table 5 and FIG. 5. FIG. 5 shows the dQ/dV discharge differential curves of the first cycle in the coin cells of Examples 1-2 and Comparative Example 1.

Discharge peaks are peaks appearing from 3.0V to 5.5V. An area ratio of discharge curves was calculated using Equation 1.

Area ratio of discharge curves=(Area of discharge curve from 4.7 V to 5.5 V ($A2$)/Area of discharge curve from 3.5 V to 5.5 V ($A1$)) [Equation 2]

TABLE 5

| Example | Voltage at which discharge main peak appears (V) | A2/A1 |
|---|---|---|
| Example 1 | 4.85 | 0.434 |
| Example 2 | 5.15 | 0.531 |
| Comparative Example 1 | 4.67 | 0.324 |

Referring to FIG. 5 and Table 5, the coin cell of Comparative Example 1, which has a positive electrode including $Li_6Co_5(P_2O_7)_4$ as a positive electrode active material, exhibits the main plateau of discharge at about 4.67V.

In contrast, the coin cells of Examples 1 and 2 were found to form a higher voltage plateau as compared with the coin cell of Comparative Example 1 and thus have an increased amount of discharge in a high voltage region. In particular, the coin cell of Example 2 provided with a positive electrode including a positive electrode active material with a higher nickel substitution amount had a higher voltage plateau as compared with the coin cell of Example 1, exhibiting a discharge plateau at 5.15 V.

In addition, as shown in Table 5, in the coin cells of Examples 1 and 2, A2/A1 was 0.434 and 0.531, respectively, indicating that the coin cells had a further increased area of the higher voltage discharge curve and a greater amount of discharge in the higher voltage range, as compared with the coin cell of Comparative Example 1.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

The invention claimed is:

1. An electrode active material including a compound represented by Formula 1 and having a triclinic crystal structure:

$Li_x(Ni_{1-y}M_y)_z(P_2O_7)_4$ <Formula 1> wherein, in Formula 1, $5 \le x \le 7$, $0.2 \le y < 1$, $4 \le z \le 6$, and

M is Co, Mn, V, Ti, Cr, Cu, Sc, Y, La, Zr, Hf, Nb, Ta, Mo, W, Re, or a combination thereof.

2. The electrode active material of claim 1, wherein in Formula 1, M is Co, Mn, V, Ti, Cr, Cu, Sc, or a combination thereof.

3. The electrode active material of claim 1, wherein in Formula 1, x is 5.5 to 6.5, or 5.8 to 6.2, y is 0.3 to 0.9, and z is 4.8 to 5.2, or 4.9 to 5.1.

4. The electrode active material of claim 3, wherein in Formula 1, x is 5.8 to 6.2, and z is 4.9 to 5.1.

5. The electrode active material of claim 1, wherein the compound represented by Formula 1 is one selected from compounds represented by Formulae 2 to 4:

$Li_x(Ni_{1-y}CO_y)_z(P_2O_7)_4$ <Formula 2> wherein in Formula 2, $5 \le x \le 7$, $0.2 \le y < 1$, and $4 \le z \le 6$, $Li_x(Ni_{1-y}Mn_y)_z(P_2O_7)_4$ <Formula 3> wherein in Formula 3, $5 \le x \le 7$, $0.2 \le y < 1$, and $4 \le z \le 6$, or $Li_x(Ni_{1-y-a}A_a)_z(P_2O_7)_4$ <Formula 4> wherein in Formula 4, $5 \le x \le 7$, $0.2 \le y < 1$, $4 \le z \le 6$, $0 < a \le 0.2$, and A is V, Nb, Ta, or a combination thereof.

6. The electrode active material of claim 1, wherein the compound represented by Formula 1 is $Li_6Ni_2Co_3(P_2O_7)_4$, $Li_6Ni_3Co_2(P_2O_7)_4$, $Li_6Ni_1Co_4(P_2O_7)_4$, $Li_6Ni_4Co_1(P_2O_7)_4$, $Li_6Mn_3Ni_2(P_2O_7)_4$, $Li_6Mn_2Ni_3(P_2O_7)_4$, $Li_6Mn_2Ni_1(P_2O_7)_4$, $Li_6Mn_2V_1Ni_2(P_2O_7)_4$, $Li_6Mn_2Nb_1Ni_2(P_2O_7)_4$, $Li_6Mn_2Ta_1Ni_2(P_2O_7)_4$, $Li_6Tc_3Ni_2(P_2O_7)_4$, $Li_6Re_3Ni_2(P_2O_7)_4$, $Li_6Ni_2Rh_3(P_2O_7)_4$, $Li_6Ni_1Rh_4(P_2O_7)_4$, $Li_6Ni_2Ir_3(P_2O_7)_4$, $Li_6Ni_1Ir_4(P_2O_7)_4$, $Li_6Ni_2V_3(P_2O_7)_4$, $Li_6Ni_1V_4(P_2O_7)_4$, $Li_6Ni_2Nb_3(P_2O_7)_4$, $Li_6Ni_1Nb_4(P_2O_7)_4$, $Li_6Ni_2Ta_3(P_2O_7)_4$, $Li_6Ni_1Ta_4(P_2O_7)_4$, $Li_6Co_2V_1Ni_2(P_2O_7)_4$, $Li_6Co_2V_2Ni_1(P_2O_7)_4$, $Li_6Ti_3Ni_2(P_2O_7)$, $Li_6Cr_3Ni_2(P_2O_7)_4$, $Li_6Cu_3Ni_2(P_2O_7)_4$, $Li_6Sc_3Ni_2(P_2O_7)_4$, or a combination thereof.

7. The electrode active material of claim 1, wherein the compound of Formula 1 exhibits a main peak in a region of a diffraction angle 2θ of 28.5=2°, as measured by X-ray diffraction analysis with CuKα radiation.

8. The electrode active material of claim 1, wherein the compound of Formula 1 has a ratio (P2/P1) of minor peak intensity (P2) to main peak intensity (P1) of 0.4 or less, as measured by X-ray diffraction analysis with CuKα radiation.

9. The electrode active material of claim 1, wherein the compound of Formula 1 has a triclinic crystal structure and a space group p-1.

10. An electrode comprising the electrode active material of claim 1.

11. A secondary battery comprising an electrode including the electrode active material of claim 1.

12. The secondary battery of claim 11, wherein the electrode is a positive electrode, and the electrode active material is a positive electrode active material with a voltage of 4.8V or more with respect to lithium.

13. The secondary battery pf claim 12, wherein in a dQ/dV charge/discharge differential curve of the battery, a dQ/dV peak voltage at which a maximum discharge curve area appears in a voltage range of 3.0V to 5.5V at a current of 0.025 C is 4.7 V or higher with respect to $Li/Li^+$.

14. The secondary battery of claim 12, wherein in a dQ/dV charge/discharge differential curve of the battery, a ratio (A2/A1) of an area (A2) of a discharge curve at 4.7V to 5.5V to an area (A1) of a discharge curve at 3.5V to 5.5V under conditions of a voltage of 3.0V to 5.5V is 0.4 or more.

15. The secondary battery of claim 12, wherein the secondary battery is a lithium secondary battery or an all-solid-state battery.

16. The secondary battery of claim 11, is an all-solid-state multilayer ceramic (MLC) battery, or an all-solid-state thin-film battery.

17. The secondary battery of claim 11, wherein the battery is an all solid-state multilayer ceramic battery has-including a laminate structure in which a plurality of cell units, each including, sequentially in the stated order, a positive electrode layer including a positive electrode active material layer, a solid electrolyte layer, and a negative electrode layer including a negative electrode active material layer, wherein the positive electrode layer including the positive electrode active material layer, the solid electrolyte layer, and the negative electrode layer including the negative electrode active material layer, are stacked such that the positive active material layer and the negative electrode active material layer face each other.

18. The secondary battery of claim 11, wherein the battery is an all soil-state multilayer ceramic battery including a laminate in which a plurality of unit cells, each including, sequentially in the stated order, a positive electrode active material layer, a solid electrolyte layer, and a negative electrode active material layer, wherein the positive electrode active material layer, the solid electrolyte layer, and the negative electrode active material layer, are stacked such that the positive active material layer and the negative electrode active material layer of adjacent unit cells face each other.

19. The secondary battery of claim 11, wherein the secondary battery is an all-solid-state secondary battery comprising: a positive electrode layer including a positive electrode active material layer; a negative electrode layer including a negative electrode current collector layer and either a first negative electrode active material layer or a third negative active material layer; and a solid electrolyte layer arranged between the positive electrode layer and the negative electrode layer, and the positive electrode active material comprises a positive electrode active material including a compound represented by Formula 1:

$$Li_x(Ni_{1-y}M_y)_z(P_2O_7)_4 \quad \text{<Formula 1>}$$

wherein in Formula 1, $5 \le x \le 7$, $0.2 \le y < 1$, $4 \le z \le 6$, and

M is Co, Mn, V, Ti, Cr, Cu, Sc, Y, La, Zr, Hf, Nb, Ta, Mo, W, Re, or a combination thereof.

20. The secondary battery of claim 19, wherein the first negative electrode active material layer comprises one or more selected from a carbonaceous negative electrode active material and a metal or metalloid negative electrode active material.

21. The secondary battery of claim 20, wherein the carbonaceous negative electrode active material comprises one or more selected from amorphous carbon and crystalline carbon, and the metal or metalloid negative active material is one or more selected from the group consisting of gold, platinum, palladium, silicon, silver, aluminum, bismuth, tin, and zinc.

22. The secondary battery of claim 19, wherein the all-solid-state secondary battery further comprises a negative electrode current collector, and a second negative electrode active material layer arranged at least one of between the negative electrode current collector and the first negative electrode active material layer, and between the solid electrolyte layer and the first negative active material layer, and the second negative electrode active material layer is a metal layer including lithium or a lithium alloy.

23. The secondary battery of claim 19, wherein the third negative electrode active material layer is a metal layer including lithium or a lithium alloy.

* * * * *